United States Patent
Chen et al.

(10) Patent No.: US 10,284,858 B2
(45) Date of Patent: May 7, 2019

(54) SUPPORT OF MULTI-MODE EXTRACTION FOR MULTI-LAYER VIDEO CODECS

(71) Applicant: QUALCOMM Incorporated, San Diego, CA (US)

(72) Inventors: Ying Chen, San Diego, CA (US); Ye-Kui Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 201 days.

(21) Appl. No.: 14/514,300

(22) Filed: Oct. 14, 2014

(65) Prior Publication Data

US 2015/0103888 A1  Apr. 16, 2015

Related U.S. Application Data

(60) Provisional application No. 61/923,624, filed on Jan. 3, 2014, provisional application No. 61/891,317, filed on Oct. 15, 2013.

(51) Int. Cl.
*H04N 19/157* (2014.01)
*H04N 19/105* (2014.01)
(Continued)

(52) U.S. Cl.
CPC ......... *H04N 19/157* (2014.11); *H04N 19/105* (2014.11); *H04N 19/172* (2014.11);
(Continued)

(58) Field of Classification Search
CPC .. H04N 19/157; H04N 19/172; H04N 19/105; H04N 19/188; H04N 21/4343;
(Continued)

(56) References Cited

U.S. PATENT DOCUMENTS

| | | | |
|---|---|---|---|
| 7,535,383 B2 * | 5/2009 | Segall | H04N 19/176 341/50 |
| 2005/0129123 A1 * | 6/2005 | Xu | H04N 19/149 375/240.16 |

(Continued)

FOREIGN PATENT DOCUMENTS

CN          102158733 A       8/2011

OTHER PUBLICATIONS

Manu, Mathew "Overview of Temporal Scalibility With Scalable Video Coding (SVC)", Texas Instruments Application Report SPRABG3 Nov. 2010.*

(Continued)

*Primary Examiner* — Gims S Philippe
*Assistant Examiner* — Stefan Gadomski
(74) *Attorney, Agent, or Firm* — Shumaker & Sieffert, P.A.

(57) ABSTRACT

A computing device may obtain, from a first bitstream that includes a coded representation of the video data, a Supplemental Enhancement Information (SEI) message that includes an indication of an extraction mode that was used to produce the first bitstream. If the extraction mode is the first extraction mode, the first bitstream includes one or more coded pictures not needed for correct decoding of the target output layer set. If the extraction mode is the second extraction mode, the first bitstream does not include the one or more coded pictures not needed for correct decoding of the target output layer set.

13 Claims, 5 Drawing Sheets

(51) Int. Cl.
  *H04N 19/172* (2014.01)
  *H04N 19/169* (2014.01)
  *H04N 21/434* (2011.01)
  *H04N 19/70* (2014.01)
  *H04N 19/30* (2014.01)
  *H04N 19/40* (2014.01)
  *H04N 21/2343* (2011.01)
  *H04N 19/597* (2014.01)

(52) U.S. Cl.
  CPC ........... *H04N 19/188* (2014.11); *H04N 19/30* (2014.11); *H04N 19/40* (2014.11); *H04N 19/70* (2014.11); *H04N 21/234327* (2013.01); *H04N 21/4343* (2013.01); *H04N 19/597* (2014.11)

(58) Field of Classification Search
  CPC ........ H04N 19/70; H04N 19/30; H04N 19/40; H04N 21/234327; H04N 19/597
  See application file for complete search history.

(56) References Cited

U.S. PATENT DOCUMENTS

| | | | |
|---|---|---|---|
| 2006/0120610 A1* | 6/2006 | Kong | H04N 21/234345 382/232 |
| 2006/0146138 A1* | 7/2006 | Xin | H04N 19/597 348/207.99 |
| 2006/0233241 A1* | 10/2006 | Ridge | H04N 21/234327 375/240.08 |
| 2007/0014349 A1* | 1/2007 | Bao | H04N 19/139 375/240.1 |
| 2007/0110150 A1* | 5/2007 | Wang | H04N 21/234327 375/240.1 |
| 2007/0121723 A1* | 5/2007 | Mathew | H04N 21/234327 375/240.12 |
| 2007/0177812 A1* | 8/2007 | Yang | H04N 19/597 382/233 |
| 2008/0037880 A1* | 2/2008 | Lai | H04N 19/172 382/232 |
| 2008/0082482 A1* | 4/2008 | Amon | H04N 21/234327 |
| 2008/0130757 A1* | 6/2008 | Trandel | H04N 21/234327 375/240.25 |
| 2008/0175325 A1* | 7/2008 | Hannuksela | H04N 21/222 375/240.26 |
| 2008/0317124 A1* | 12/2008 | Cho | H04N 19/597 375/240.08 |
| 2009/0003439 A1* | 1/2009 | Wang | H04N 19/70 375/240.08 |
| 2009/0201990 A1* | 8/2009 | Leprovost | H04N 21/234327 375/240.12 |
| 2010/0005185 A1* | 1/2010 | Liu | H04L 67/104 709/231 |
| 2010/0061452 A1* | 3/2010 | Pandit | H04N 19/61 375/240.12 |
| 2010/0272187 A1* | 10/2010 | Civanlar | G11B 27/105 375/240.25 |
| 2010/0316122 A1* | 12/2010 | Chen | H04N 21/234327 375/240.12 |
| 2010/0316134 A1* | 12/2010 | Chen | H04N 21/21805 375/240.25 |
| 2011/0149033 A1* | 6/2011 | Zhao | H04N 19/597 348/43 |
| 2011/0164683 A1* | 7/2011 | Takahashi | H04N 19/70 375/240.16 |
| 2012/0044322 A1* | 2/2012 | Tian | H04N 19/597 348/43 |
| 2012/0183076 A1* | 7/2012 | Boyce | H04N 19/105 375/240.25 |
| 2012/0183077 A1* | 7/2012 | Hong | H04N 19/70 375/240.25 |
| 2012/0269275 A1* | 10/2012 | Hannuksela | H04N 13/0048 375/240.25 |
| 2013/0034170 A1* | 2/2013 | Chen | H04N 13/00 375/240.25 |
| 2013/0070859 A1* | 3/2013 | Lu | H04N 19/39 375/240.25 |
| 2013/0141535 A1* | 6/2013 | Hattori | H04N 19/597 348/43 |
| 2013/0195201 A1* | 8/2013 | Boyce | H04N 19/70 375/240.25 |
| 2013/0208792 A1* | 8/2013 | He | H04N 19/00569 375/240.12 |
| 2013/0222537 A1* | 8/2013 | Chen | H04N 19/597 348/43 |
| 2013/0266077 A1* | 10/2013 | Boyce | H04N 19/70 375/240.25 |
| 2013/0286885 A1* | 10/2013 | Hwang | H04N 21/2381 370/252 |
| 2013/0314498 A1 | 11/2013 | Hui et al. | |
| 2013/0315124 A1* | 11/2013 | Rapaport | H04W 4/08 370/312 |
| 2014/0003489 A1* | 1/2014 | Hannuksela | H04N 19/70 375/240.02 |
| 2014/0092213 A1 | 4/2014 | Chen et al. | |
| 2014/0092996 A1* | 4/2014 | Wang | H04N 19/70 375/240.26 |
| 2014/0168362 A1* | 6/2014 | Hannuksela | H04N 13/161 348/43 |
| 2014/0169449 A1* | 6/2014 | Samuelsson | H04N 19/105 375/240.02 |
| 2014/0185681 A1* | 7/2014 | Kwon | H04N 19/31 375/240.16 |
| 2014/0286415 A1* | 9/2014 | Kang | H04N 19/597 375/240.12 |
| 2014/0301452 A1* | 10/2014 | Deshpande | H04N 19/503 375/240.12 |
| 2014/0301453 A1* | 10/2014 | Deshpande | H04N 19/50 375/240.12 |
| 2014/0301476 A1* | 10/2014 | Deshpande | H04N 19/70 375/240.25 |
| 2015/0016532 A1* | 1/2015 | Chen | H04N 19/597 375/240.16 |
| 2015/0016546 A1* | 1/2015 | Wang | H04N 19/188 375/240.26 |
| 2015/0078446 A1* | 3/2015 | Jun | H04N 19/593 375/240.12 |
| 2015/0103884 A1 | 4/2015 | Ramasubramonian et al. | |
| 2015/0103886 A1* | 4/2015 | He | H04N 19/188 375/240.02 |
| 2015/0103921 A1* | 4/2015 | Hannuksela | H04N 19/433 375/240.26 |
| 2015/0103924 A1* | 4/2015 | Misra | H04N 19/152 375/240.26 |
| 2015/0124884 A1* | 5/2015 | Yuzawa | H04N 19/70 375/240.16 |
| 2015/0326865 A1* | 11/2015 | Yin | H04N 19/46 375/240.13 |
| 2015/0341636 A1* | 11/2015 | Tsai | H04N 19/597 375/240.02 |
| 2016/0050436 A1* | 2/2016 | Liu | H04N 19/597 375/240.24 |
| 2016/0065980 A1* | 3/2016 | Choi | H04N 19/70 375/240.25 |
| 2016/0142762 A1* | 5/2016 | Tsukagoshi | H04N 21/236 725/116 |
| 2016/0165242 A1* | 6/2016 | Lee | H04N 19/30 375/240.08 |
| 2016/0173893 A1* | 6/2016 | Lee | H04N 19/105 375/240.08 |
| 2016/0191926 A1* | 6/2016 | Deshpande | H04N 19/597 375/240.12 |
| 2016/0212438 A1* | 7/2016 | Andersson | H04N 19/48 |
| 2016/0241883 A1* | 8/2016 | Lee | H04N 19/70 |
| 2016/0249056 A1* | 8/2016 | Tsukuba | H04N 19/70 |
| 2016/0255353 A1* | 9/2016 | Deshpande | H04N 19/61 |
| 2016/0255373 A1* | 9/2016 | Deshpande | H04N 19/70 |

(56) References Cited

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, 27 Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (For FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen et al., "MV-HEVC/SHVC HLS: On multi-mode bitstream extraction", JCT-3V Meeting; Oct. 25-Nov. 1, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-F0091, JCTVC-O0273; XP030131502, Oct. 15, 2013, 9 pp.
Chen, et al., "MV-HEVC/SHVC HLS: Sub-bitstream property SEI message", JCT-3V Meeting; Jan. 9-17, 2014; San Jose; (The Joint Collaborative Team on 3D Video Coding Extension Development of ISO/IEC JTC1/SC29/WG11 and ITU-T SG.16 ); URL: http://phenix.int-evry.fr/jct2/,,No. JCT3V-G0165, JCTVC-P0204; XP030131319504, Jan. 2014, 4 pp.
Sjoberg, et al., "Overview of HEVC high-level syntax and reference picture management", IEEE Transactions on Circuits and Systems for Video Technology, Jan. 2012, XP055045360, ISSN: 1051-8215, 14 pp.
Wang, et al., "High Efficiency Video Coding (HEVC) Defect Report", JCT-VC Meeting; Jul. 25-Aug. 2, 2013; Vienna; (Joint Collaborative Team on Video Coding of ISO/IEC JTC1/SC29/WG11 and ITU-TSG.16 ); URL: http://wftp3.itu.int/av-arch/jctvc-site/, No. JCTVC-N1003_v1, Sep. 27, 2013, XP030114947, 311 pp. [uploaded in parts].

Wang, et al., "MV-HEVC/SHVC HLS: On changing of the highest layer ID across AUs and multi-mode bitstream extraction", JCT-3V Meeting; Jul. 25-Aug. 2, 2013; Vienna; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-E0087, Jul. 16, 2013, XP030131091, 4 pp.
Tech, et al., "MV-HEVC Draft Text 5," JCT-3V Meeting; Jul. 27-Aug. 2, 2013, (The Joint Collaborative Team on 3D Video Coding Extension Development of ISO/IEC JTC1/SC29/WG11 and ITU-T SG.16 ); Document: JCT3V-E1004-v6, Aug. 7, 2013, 65 pp.
Wang et al., "MV-hevc/shvc HLS: On changing of the highest layer ID across AUs and multi-mode bitstream extraction," JCT-3V Meeting; Jul. 25-Aug. 2, 2013, (The Joint Collaborative Team on 3D Video Coding Extension Development of ISO/IEC JTC1/SC29/WG11 and ITU-T SG.16 ); Document: JCTVC-N0267/E0087, 4 pp.
Chen, et al., "High efficiency video coding (HEVC) scalable extension draft 3," JCT-3V Meeting; Jul. 25-Aug. 2, 2013, (The Joint Collaborative Team on 3D Video Coding Extension Development of ISO/IEC JTC1/SC29/WG11 and ITU-T SG.16 ); Document: JCTVC-N1008_v3, 68 pp.
Chen, et al., "High efficient video coding (HEVC) scalable extension Draft 4," JCT-VC Meeting; Oct. 23-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-O1008, Nov. 14, 2013 , XP030115462, 74 pp.
Tech, et al., "MV-HEVC Draft Text 6," JCT-3V Meeting; Oct. 25-Nov. 1, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-F1004, Nov. 7, 2013, XP030131734, 84 pp.
Tech, et al., "3D-HEVC Test Model 4", JCT-3V Meeting; Incheon; Apr. 20-26, 2013, (The Joint Collaborative Team on 3D Video Coding Extension Development of ISO/IEC JTC1/SC29/WG11 and ITU-T SG.16), No. JCT3V-D1005_spec_v1, Jun. 17, 2013, XP030130998, 88 pp.
Tech, et al., "3D-HEVC Test Model 4", JCT-3V Meeting; Apr. 20-26, 2013; Incheon; (The Joint Collaborative Team on 3D Video Coding Extension Development of ISO/IEC JTC1/SC29/WG11 and ITU-T SG.16); URL: http://phenix.int-evry.fr/jct2/, No. JCT3V-D1005, Jun. 17, 2013, XP030130983, 52 pp.
Tech G., et al., "3D-HEVC Test Model 2," JCT3V-B1005_d0, Joint Collaborative Team on 3D Video Coding Extension Development of ITU-T SG 16 WP 3 and ISO/IEC JTC 1/SC 29/WG 11, 2nd Meeting: Shanghai, CN, Oct. 13-19, 2012, 126 Pages.
International Search Report and Written Opinion from International Application No. PCT/US2014/060617, dated Dec. 22, 2014, 13 pp.
Response to Written Opinion dated Dec. 22, 2014, from International Application No. PCT/US2014/060617, filed Feb. 20, 2015, 6 pp.
Second Written Opinion from International Application No. PCT/US2014/060617, dated Sep. 22, 2015, 7 pp.
Response to Second Written Opinion dated Sep. 22, 2015, from International Application No. PCT/US2014/060617, filed Nov. 9, 2015, 6 pp.
International Preliminary Report on Patentability from International Application No. PCT/US2014/060617, dated Jan. 25, 2016, 11 pp.
Wang, et al., "High Efficiency Video Coding (HEVC) Defect Report 2," Joint Collaboration Team of Video Coding, ITU-T SG 16 WP 3 and ISO/IEC JTC 1/SC 29/WG 11, Oct. 23-Nov. 1, 2013, Document JCTVC-O1003_V2, 311 pp.
Tech, et al., "MV-HEVC Draft Text 6," JCT-3V Meeting; Oct. 25, 2013-Nov. 1, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-F1004, Nov. 7, 2013, XP030131734 84 pp.
Tech, et al., "3D-HEVC Test Model 3", JCT-3V Meeting; MPEG Meeting; Jan. 17, 2013-Jan. 20, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-C1005, Mar. 15, 2013; XP030130664, 52 pp.
Okubo S., "Third Revised Edition of 11.264/AVC Textbook", Impress R & D, Jan. 1, 2009, 3 Pages, First Edition.

(56) References Cited

OTHER PUBLICATIONS

Wang Y-K., et al., "MV-HEVC/SHVC HLS: On Changing of the Highest Layer ID Across AUs and Multi-Mode Bitstream Extraction", JCTVC-N0267, Joint Collaborative Team on Video Coding (JCT-VC) of ITU-T SG 16 WP 3 and ISO/IEC JTC 1/SC 29/WG 11 14th Meeting: Vienna, Jul. 15, 2013, pp. 1-5.

* cited by examiner

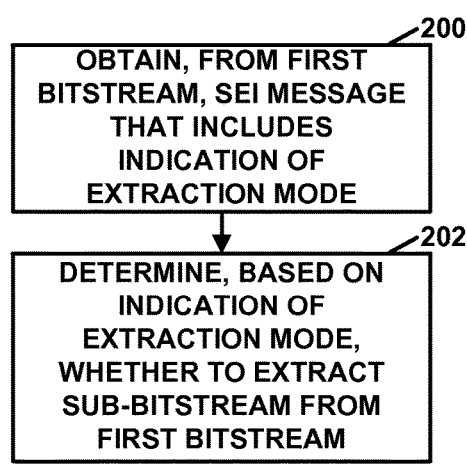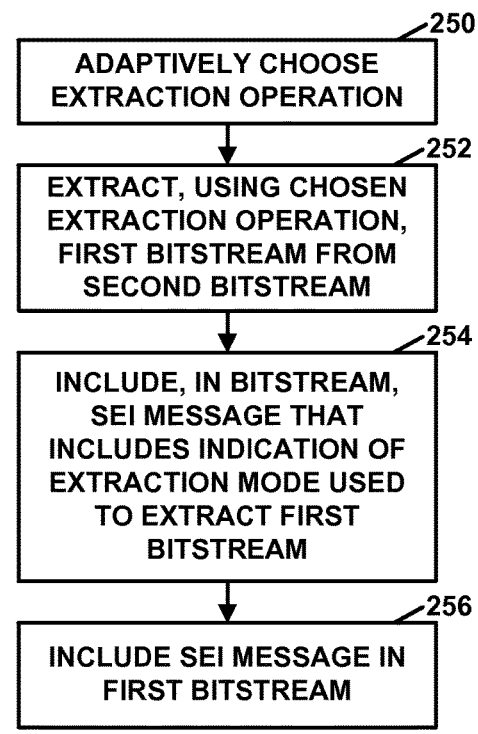
FIG. 5A
FIG. 5B

SUPPORT OF MULTI-MODE EXTRACTION FOR MULTI-LAYER VIDEO CODECS

This application claims the benefit of U.S. Provisional Patent Application No. 61/891,317, filed Oct. 15, 2013, and U.S. Provisional Patent Application No. 61/923,624, filed Jan. 3, 2014, the entire content of each of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view coding bitstream may be generated by encoding views, e.g., from multiple perspectives. Some three-dimensional (3D) video standards have been developed that make use of multi-view coding aspects. For example, different views may transmit left and right eye views to support 3D video. Alternatively, some 3D video coding processes may apply so-called multi-view plus depth coding. In multi-view plus depth coding, a 3D video bitstream may contain not only texture view components, but also depth view components. For example, each view may comprise one texture view component and one depth view component.

SUMMARY

In general, this disclosure relates to methods for better support of multi-mode bitstream extraction modes for multi-layer video codecs, techniques including enabling sub-bitstreams extracted with each of the multiple modes to be conforming, the indication of capability of multi-mode extraction in a multi-layer video codec as well as in the system layers.

In one aspect, this disclosure describes a method of processing video data, the method comprising: obtaining, from a first bitstream that includes a coded representation of the video data, a Supplemental Enhancement Information (SEI) message that includes an indication of an extraction mode that was used to extract the first bitstream from a second bitstream, wherein: the first bitstream is a sub-bitstream extracted from the second bitstream according to the extraction mode, regardless of whether the extraction mode is a first extraction mode or a second extraction mode, the first bitstream includes sufficient Network Abstraction Layer (NAL) units to decode and output pictures in a target output layer set, if the extraction mode is the first extraction mode, the first bitstream include one or more coded pictures not needed for correct decoding of the target output layer set, and if the extraction mode is the second extraction mode, the first bitstream does not include the one or more coded pictures not needed for correct decoding of the target output layer set.

In another aspect, this disclosure describes a method of processing video data, the method comprising: generating a SEI message that includes an indication of an extraction mode that was used to extract a first bitstream from a second bitstream, the first bitstream including a coded representation of the video data, wherein: the first bitstream is a sub-bitstream extracted from the second bitstream according to the extraction mode, regardless of whether the extraction mode is a first extraction mode or a second extraction mode, the first bitstream includes sufficient NAL units to decode and output pictures in a target output layer set for the first bitstream, if the extraction mode is the first extraction mode, the first bitstream includes one or more coded pictures not needed for correct decoding of the target output layer set, and if the extraction mode is the second extraction mode, the first bitstream does not include the one or more coded pictures not needed for correct decoding of the target output layer set; and including the SEI message in the first bitstream.

In another aspect, this disclosure describes a device for processing video data, the device comprising: a memory that stores the video data; and one or more processors configured to obtain, from a first bitstream that includes a coded representation of the video data, a SEI message that includes an indication of an extraction mode that was used to extract the first bitstream from a second bitstream, wherein: the first bitstream is a sub-bitstream extracted from the second bitstream according to the extraction mode, regardless of whether the extraction mode is a first extraction mode or a second extraction mode, the first bitstream includes sufficient NAL units to decode and output pictures in a target output layer set for the first bitstream, if the extraction mode is the first extraction mode, the first bitstream includes one or more coded pictures not needed for correct decoding of the target output layer set, and if the extraction mode is the second extraction mode, the first bitstream does not include the one or more coded pictures not needed for correct decoding of the target output layer set.

In another aspect, this disclosure describes a device for processing video data, the device comprising: a memory that stores the video data; and one or more processors configured to: generate a SEI message that includes an indication of an extraction mode that was used to extract a first bitstream from a second bitstream, the first bitstream including a coded representation of the video data, wherein: the first bitstream is a sub-bitstream extracted from the second bitstream according to the extraction mode, regardless of whether the extraction mode is a first extraction mode or a second extraction mode, the first bitstream includes sufficient NAL units to decode and output pictures in a target output layer set for the first bitstream, if the extraction mode is the first extraction mode, the first bitstream includes one or more coded pictures not needed for correct decoding of the target output layer set, and if the extraction mode is the second extraction mode, the first bitstream does not include the one or more coded pictures not needed for correct decoding of the target output layer set; and include the SEI message in the first bitstream.

In another aspect, this disclosure describes a device for processing video data, the device comprising: means for obtaining, from a first bitstream that includes a coded representation of the video data, a SET message that includes an indication of an extraction mode that was used to extract the first bitstream from a second bitstream, wherein: the first bitstream is a sub-bitstream extracted from the second bitstream according to the extraction mode, regardless of whether the extraction mode is a first extraction mode or a second extraction mode, the first bitstream includes sufficient NAL units to decode and output pictures in a target output layer set, if the extraction mode is the first extraction mode, the first bitstream include one or more coded pictures not needed for correct decoding of the target output layer set, and if the extraction mode is the second extraction mode, the first bitstream does not include the one or more coded pictures not needed for correct decoding of the target output layer set.

In another aspect, this disclosure describes a device for processing video data, the device comprising: means for generating a SET message that includes an indication of an extraction mode that was used to extract a first bitstream from a second bitstream, the first bitstream including a coded representation of the video data, wherein: the first bitstream is a sub-bitstream extracted from the second bitstream according to the extraction mode, regardless of whether the extraction mode is a first extraction mode or a second extraction mode, the first bitstream includes sufficient NAL units to decode and output pictures in a target output layer set for the first bitstream, if the extraction mode is the first extraction mode, the first bitstream includes one or more coded pictures not needed for correct decoding of the target output layer set, and if the extraction mode is the second extraction mode, the first bitstream does not include the one or more coded pictures not needed for correct decoding of the target output layer set; and means for including the SEI message in the first bitstream.

In another aspect, this disclosure describes a computer-readable data storage medium having instructions stored thereon that when executed cause a device to obtain, from a first bitstream that includes a coded representation of the video data, a SEI message that includes an indication of an extraction mode that was used to extract the first bitstream from a second bitstream, wherein: the first bitstream is a sub-bitstream extracted from the second bitstream according to the extraction mode, regardless of whether the extraction mode is a first extraction mode or a second extraction mode, the first bitstream includes sufficient NAL units to decode and output pictures in a target output layer set, if the extraction mode is the first extraction mode, the first bitstream include one or more coded pictures not needed for correct decoding of the target output layer set, and if the extraction mode is the second extraction mode, the first bitstream does not include the one or more coded pictures not needed for correct decoding of the target output layer set.

In another aspect, this disclosure describes a computer-readable data storage medium having instructions stored thereon that when executed cause a device to generate a SEI message that includes an indication of an extraction mode that was used to extract a first bitstream from a second bitstream, the first bitstream including a coded representation of the video data, wherein: the first bitstream is a sub-bitstream extracted from the second bitstream according to the extraction mode, regardless of whether the extraction mode is a first extraction mode or a second extraction mode, the first bitstream includes sufficient NAL units to decode and output pictures in a target output layer set for the first bitstream, if the extraction mode is the first extraction mode, the first bitstream includes one or more coded pictures not needed for correct decoding of the target output layer set, and if the extraction mode is the second extraction mode, the first bitstream does not include the one or more coded pictures not needed for correct decoding of the target output layer set; and include the SEI message in the first bitstream.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 5A is a flowchart illustrating an example operation of a computing device, in accordance with one or more techniques of this disclosure.

FIG. 5B is a flowchart illustrating an example operation of a computing device, in accordance with one or more techniques of this disclosure.

DETAILED DESCRIPTION

Figure 1:
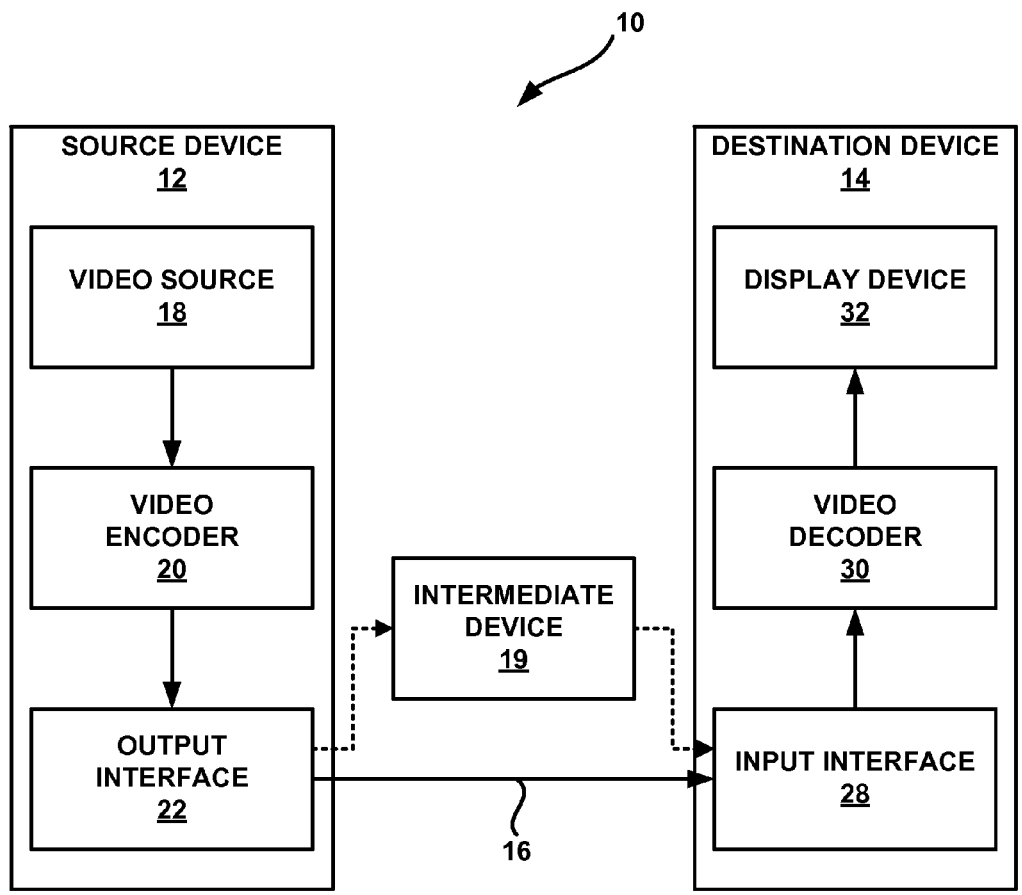
FIG. 1 is a block diagram illustrating an example video coding system that may utilize the techniques described in this disclosure.

In general, a coded video bitstream comprises a sequence of bits representing coded pictures and associated data forming one or more coded video sequences. The sequence of bits may form of a Network Abstraction Layer (NAL) unit stream or a byte stream. A NAL unit stream is a stream of NAL units. In multi-view coding and scalable video coding, each NAL unit may specify a layer to which the NAL unit belongs. Different NAL units in the same bitstream may specify that the different NAL units belong to different layers. In multi-view coding, each of the layers may correspond to a different view. In scalable video coding, the layers may include a base layer and one or more enhancement layers. Because a NAL unit belonging to a particular layer may be contain data of a coded picture, the coded picture may also be said to belong to the particular layer.

In order to reduce the size of a bitstream, a computing device may extract particular NAL units from the bitstream. For instance, the computing device may extract from the bitstream all of the NAL units belonging to a particular set of layers. The NAL units extracted from a bitstream are a subset of the bitstream. This disclosure may refer to a bitstream comprising NAL units extracted from another bitstream as a sub-bitstream. The sub-bitstream may be decodable without the use of NAL units not extracted from the bitstream. The computing device may discard NAL units not extracted from the bitstream. Alternatively, the computing device may extract one or more sub-bitstreams from a common source bitstream, and forward data for the various sub-bitstreams, as well as data for the source bitstream, to different respective destinations. For ease of explanation, this disclosure may describe extracting NAL units of a sub-bitstream from a bitstream as extracting the sub-bitstream from the bitstream.

A computing device may extract a sub-bitstream from a bitstream according to a variety of extraction modes. In general, an extraction mode is a mode of extracting a sub-bitstream from a source bitstream. For example, when a computing device extracts a sub-bitstream from a bitstream according to one extraction mode, the sub-bitstream may be "fully-extractable." If a sub-bitstream is fully-extractable, each sub-bitstream further extracted from the sub-bitstream, recursively, can be a conforming bitstream. In this disclosure, a conforming bitstream may be a bitstream that conforms to a video coding standard. In other words, a conforming bitstream is a bitstream that can be correctly decoded according to a video coding standard. In another example, when a computing device extracts a sub-bitstream from a bitstream according to another extraction mode, the sub-bitstream may be "size optimized." If a sub-bitstream extracted from a bitstream is size optimized, the sub-bitstream may exclude pictures of the bitstream that are not needed for correct decoding of a set of target output layers, which may result in the sub-bitstream no longer conforming to an applicable video coding standard, yet nevertheless remain decodable. Each layer in the set of target output layers may include pictures that are intended for subsequent output (e.g., display). A size-optimized bitstream may include NAL units belonging to layers other than the set of target output layers because such NAL units may include data needed for decoding of pictures of the set of target output layers. Because a size-optimized bitstream excludes such pictures, it may be impossible to extract particular sub-bitstreams from the size-optimized bitstream. For example, a size-optimized bitstream may include NAL units of a particular layer that are used for inter-layer (e.g., inter-view) prediction, but exclude other NAL units of the particular layer, e.g., NAL units that are not used for inter-layer prediction. Thus, a fully extractable bitstream may include one or more coded pictures not needed for correct decoding of the target output layer set, but a size-optimized bitstream does not include the one or more coded pictures not needed for correct decoding of the target output layer set.

A computing device, such as a Media Aware Network Element (MANE), that receives a bitstream may not be able to determine the extraction mode used to produce the bitstream, if any. For example, it may be impractical for the computing device to determine whether the bitstream is a fully-extractable bitstream or a size-optimized bitstream. If the computing device extracts a sub-bitstream from the bitstream and the bitstream happens to be a fully-extractable bitstream, the extracted sub-bitstream is a conforming bitstream that a video decoder may be able to decode. However, if the computing device extracts a sub-bitstream from the bitstream and the bitstream happens to be a size-optimized bitstream, the extracted sub-bitstream may not be a conforming bitstream that a video decoder is able to decode.

The techniques of this disclosure may address this issue. For instance, in accordance with one or more techniques of this disclosure, a computing device may obtain, from a first bitstream that includes a coded representation of video data, a Supplemental Enhancement Information (SEI) message that includes an indication of an extraction mode that was used to extract the first bitstream from a second bitstream. The first bitstream is a sub-bitstream extracted from the second bitstream according to the extraction mode. Regardless of whether the extraction mode is a first extraction mode or a second extraction mode, the first bitstream includes sufficient Network Abstraction Layer (NAL) units to decode and output pictures in a target output layer set for the first bitstream. If the extraction mode is the first extraction mode, the first bitstream includes one or more coded pictures not needed for correct decoding of the target output layer set. If the extraction mode is the second extraction mode, the first bitstream does not include the one or more coded pictures not needed for correct decoding of the target output layer set. Similarly, a computing device may generate an SEI message that includes an indication of the extraction mode that was used to extract the first bitstream from a second bitstream. The computing device may include the SEI message in the first bitstream.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Furthermore, in the example of FIG. 1, video coding system 10 includes an intermediate device 19. Intermediate device 19 may receive video data encoded by source device 12. In some examples, intermediate device 19 may receive the encoded video data from source device 12 via a channel similar to channel 16. Intermediate device 19 may process the encoded video data. For example, intermediate device 19 may apply bitstream extraction to the encoded video data to remove particular NAL units from the encoded video data. Destination device 14 may receive video data processed by intermediate device 19. In some examples, destination device 14 may receive the processed video data via a channel similar to channel 16. In various examples, intermediate device 19 may comprise various types of computing devices. For instance, in some examples, intermediate device 19 comprises a media aware network element (MANE). Furthermore, in some examples, intermediate device 19 is part of a content delivery network (CDN).

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based 3DV extension. In some instances, any bitstream conforming to the MVC-based 3DV extension of H.264/AVC always contains a sub-bitstream that is compliant to the MVC extension of H.264/AVC. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, ITU-T H.264, and ITU-T H.264, ISO/IEC Visual.

Furthermore, in other examples, video encoder 20 and video decoder 30 may operate according to the High Efficiency Video Coding (HEVC) developed by the Joint Collaboration Team on Video Coding (JCT-VC) of ITU-T Video Coding Experts Group (VCEG) and ISO/IEC Motion Picture Experts Group (MPEG), or extensions thereof. Wang et al., "High Efficiency Video Coding (HEVC) Defect Report," JCTVC-N1003-v1, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 is a draft specification of the HEVC standard, referred to herein as HEVC WD hereinafter or "HEVC version 1." Wang et al., "High Efficiency Video Coding (HEVC) Defect Report 2," JCTVC-O1003-v2, Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013 is another draft specification of the HEVC standard.

There are ongoing efforts to produce scalable video coding, multi-view coding, and 3DV extensions for HEVC. The scalable video coding extension of HEVC may be referred to as SHEVC or SHVC. Chen et al., "High efficiency video coding (HEVC) scalable extension Draft 4," JCTVC-N1008-v3, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 is a Working Draft (WD) of SHVC, which is referred to as SHVC WD3 hereinafter. Chen et al., "High efficiency video coding (HEVC) scalable extension Draft 4," JCTVC-O1008-v1, Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013 is another working draft of SHVC, which is referred to as SHVC WD4 hereinafter. The multi-view extension to HEVC, namely MV-HEVC, is also being developed by the JCT-3V. Tech et al., "MV-HEVC Draft Text 5," JCT3V-E1004-v6, Joint Collaborative Team on 3D Video Coding Extension Development of ITU-T SG 16 WP 3 and ISO/IEC JTC 1/SC 29/WG 11, 5th Meeting: Vienna, AT, 27 Jul.-2 Aug. 2013 is a Working Draft (WD) of MV-HEVC, referred to herein as MV-HEVC WD5 hereinafter. Tech et al., "MV-HEVC Draft Text 6," JCT3V-F1004-v6, Joint Collaborative Team on 3D Video Coding Extension Development of ITU-T SG 16 WP 3 and ISO/IEC JTC 1/SC 29/WG 11, 6th Meeting: Geneva, CH, 25 Oct.-1 Nov. 2013 is another working draft of MV-HEVC, referred to herein as MV-HEVC WD6 hereinafter.

Currently, a Joint Collaboration Team on 3D Video Coding (JCT-3C) of VCEG and MPEG is developing a 3DV standard based on HEVC, for which part of the standardization efforts includes the standardization of the multi-view video codec based on HEVC (MV-HEVC) and another part for 3D video coding based on HEVC (3D-HEVC). For MV-HEVC, it should be guaranteed that there are only high-level syntax (HLS) changes in it, such that no module in the coding unit (CU)/prediction unit (PU) level in HEVC needs to be re-designed and can be fully reused for MV-HEVC. In other words, MV-HEVC only provides for high-level syntax changes and not for low-level syntax changes, such as those at the CU/PU level. For 3D-HEVC, new coding tools, including those in coding unit/prediction unit level, for both texture and depth views may be included and supported.

The reference software description as well as the working draft of 3D-HEVC is available as follows: Gerhard Tech, Krzysztof Wegner, Ying Chen, Sehoon Yea, "3D-HEVC Test Model 4," JCT3V-D1005_spec_v1, Joint Collaborative Team on 3D Video Coding Extension Development of ITU-T SG 16 WP 3 and ISO/IEC JTC 1/SC 29/WG 11, 4nd Meeting: Incheon, KR, April 2013. Gerhard Tech, Krzysztof Wegner, Ying Chen, Sehoon Yea, "3D-HEVC Test Model 3," JCT3V-C1005_d0, Joint Collaborative Team on 3D Video Coding Extension Development of ITU-T SG 16 WP 3 and ISO/IEC JTC 1/SC 29/WG 11, 3rd Meeting: Geneva, CH, January 2013 is another version of the reference software description of 3D-HEVC. Video encoder 20 and video decoder 30 may operate according to SHEVC, MV-HEVC, and/or 3D-HEVC.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order, or other order.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. Video encoder 20 may generate predictive luma, Cb, and Cr blocks for luma, Cb, and Cr prediction blocks of each PU of the CU. In monochrome pictures or pictures having three separate color planes, a PU may comprise a single prediction block and syntax structures used to predict the prediction block.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. In some versions of HEVC, for the luma component of each PU, an intra prediction method is utilized with 33 angular prediction modes (indexed from 2 to 34). DC mode (indexed with 1) and Planar mode (indexed with 0).

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a sample block of the PU and the first reference location and a second motion vector indicating a spatial displacement between the prediction block of the PU and the second reference location.

After video encoder 20 generates predictive blocks (e.g., predictive luma, Cb, and Cr blocks) for one or more PUs of a CU, video encoder 20 may generate one or more residual blocks for the CU. Each sample in a residual block of the CU may indicate a difference between a sample in a predictive block of the CU and a corresponding sample in a coding block of the CU. For example, video encoder 20 may generate a luma residual block for the CU. Each sample in the luma residual block of the CU indicates a difference between a luma sample in one of the luma predictive blocks of the PUs of the CU and a corresponding sample in the luma coding block of the CU. In addition, video encoder 20 may generate a Cb residual block for the CU. Each sample in the Cb residual block of the CU may indicate a difference between a Cb sample in one of the predictive Cb blocks of PUs of the CU and a corresponding sample in the Cb coding block of the CU. Video encoder 20 may also generate a Cr residual block for the CU. Each sample in the Cr residual block of the CU may indicate a difference between a Cr sample in one of the predictive Cr blocks of a PU of the CU and a corresponding sample in the Cr coding block of the CU.

Furthermore, video encoder 20 may use quad-tree partitioning to decompose the residual blocks (e.g., luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the luma residual block of the CU. The Cb transform block may be a sub-block of the Cb residual block of the CU. The Cr transform block may be a sub-block of the Cr residual block of the CU. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. A coefficient block may be a two-dimensional array of transform coefficients. A transform coefficient may be a scalar quantity. For example, video encoder 20 may apply one or more transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI) (i.e., an SET RBSP), and so on. NAL units that encapsulate RBSPs for video coding data (as opposed to RBSPs for parameter sets and SEI messages) may be referred to as video coding layer (VCL) NAL units. SEI contains information that is not necessary to decode the samples of coded pictures from VCL NAL units. A SET RBSP may include one or more SEI messages.

HEVC and other video coding standards provide for various types of parameter sets. For example, a video parameter set (VPS) is a syntax structure comprising syntax elements that apply to zero or more entire coded video sequences (CVSs). A sequence parameter set (SPS) may contain information that applies to all slices of a CVS. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded. Parameter sets may include extensions for particular extensions of video coding standards. An extension of a parameter set may include syntax elements specific to an extension of a video coding standard. For example, an extension of a parameter set may include syntax elements used in SHVC, MV-HEVC, or 3D-HEVC but not base HEVC.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In multi-view coding, there may be multiple views of the same scene from different viewpoints. The term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence or set of view components associated with the same view identifier. A view component may contain a texture view component and a depth view component. In this disclosure, a "view" may refer to a set or sequence of one or more view components associated with the same view identifier.

A texture view component (i.e., a texture picture) may be a coded representation of the texture of a view in a single access unit. A texture view may be a sequence of texture view components associated with an identical value of a view order index. A view order index of a view may indicate a camera position of the view relative to other views. A depth view component (i.e., a depth picture) may be a coded representation of the depth of a view in a single access unit. A depth view may be a set or sequence of one or more depth view components associated with an identical value of view order index.

Multi-view coding supports inter-view prediction. Inter-view prediction is similar to the inter prediction used in HEVC and may use the same syntax elements. However, when a video coder performs inter-view prediction on a current video block (such as a PU), video encoder 20 may use, as a reference picture, a picture that is in the same access unit as the current video block, but in a different view. In contrast, conventional inter prediction only uses pictures in different access units as reference pictures.

In multi-view coding, a bitstream may have a plurality of layers. Each of the layers may correspond to a different view. In multi-view coding, a view may be referred to as a "base view" if a video decoder (e.g., video decoder 30) can decode pictures in the view without reference to pictures in any other view. A view may be referred to as a "non-base view" or a "dependent view" if decoding of the view is dependent on decoding of pictures in one or more other views. When coding a picture in one of the non-base views, a video coder (such as video encoder 20 or video decoder 30) may include, in a reference picture list, a picture that is in a different view but within a same time instance (i.e., access unit) as the picture that the video coder is currently coding. Like other inter prediction reference pictures, the video coder may insert an inter-view prediction reference picture at any position of a reference picture list.

In SVC, layers other than the base layer may be referred to as "enhancement layers" and may provide information that enhances the visual quality of video data decoded from the bitstream. SVC can enhance spatial resolution, signal-to-noise ratio (i.e., quality) or temporal rate. In scalable video coding (e.g., SHVC), a "layer representation" may be a coded representation of a spatial layer in a single access unit.

For ease of explanation, this disclosure may refer to view components and/or layer representations as "view components/layer representations."

To implement the layers, headers of NAL units may include nuh_reserved_zero_6bits syntax elements. In HEVC version 1, the nuh_reserved_zero_6bits syntax element is reserved. However, in MV-HEVC, 3D-HEVC, and SVC, the nuh_reserved_zero_6bits syntax element is referred to as the nuh_layer_id syntax element. The nuh_layer_id syntax element specifies an identifier of a layer. NAL units of a bitstream that have nuh_layer_id syntax elements that specify different values belong to different layers of the bitstream.

In some examples, the nuh_layer_id syntax element of a NAL unit is equal to 0 if the NAL unit relates to a base layer in multi-view coding (e.g., MV-HEVC), 3DV coding (e.g. 3D-HEVC), or scalable video coding (e.g., SHVC). Data in a base layer of a bitstream may be decoded without reference to data in any other layer of the bitstream. If a NAL unit does not relate to a base layer in multi-view coding, 3DV, or scalable video coding, the nuh_layer_id syntax element of the NAL unit may have a non-zero value.

Furthermore, some view components/layer representations within a layer may be decoded without reference to other view components/layer representations within the same layer. Thus, NAL units encapsulating data of certain view components/layer representations of a layer may be removed from the bitstream without affecting the decodability of other view components/layer representations in the layer. Removing NAL units encapsulating data of such view components/layer representations may reduce the frame rate of the bitstream. A subset of view components/layer representations within a layer that may be decoded without reference to other view components/layer representations within the layer may be referred to herein as a "sub-layer" or a "temporal sub-layer."

NAL units may include temporal_id syntax elements that specify temporal identifiers (i.e., TemporalIds) of the NAL units. The temporal identifier of a NAL unit identifies a sub-layer to which the NAL unit belongs. Thus, each sub-layer of a bitstream may have a different temporal identifier. In general, if the temporal identifier of a first NAL unit of a layer is less than the temporal identifier of a second NAL unit of the same layer, the data encapsulated by the first NAL unit may be decoded without reference to the data encapsulated by the second NAL unit.

A bitstream may be associated with a plurality of operation points. Each operation point of a bitstream is associated with a set of layer identifiers (e.g., a set of nuh_layer_id values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point.

A video processor (e.g., a media aware network element (MANE), splicing engine, video decoder, or other device) may apply bitstream thinning to an HEVC bitstream. At any point in the bitstream, a video processor can start removing or stop decoding NAL units of higher sub-layers (i.e., sub-layers associated with higher temporal identifiers) based on the fact that the pictures in the lower sub-layers (i.e., sub-layers associated with lower temporal identifiers) are still decodable because the decoding process for the pictures in the lower sub-layers does not depend on the NAL units of the higher sub-layers. The action of removing or stopping decoding of all NAL units with temporal identifiers higher than a certain value can be referred to as temporal down-switching. Temporal down-switching may always be possible.

The term "temporal up-switching" may refer to the action of starting to forward or starting to decode NAL units of a certain sub-layer that has not been forwarded or decoded up until that point. Temporal up-switching may only be possible if none of the pictures in the layer that is switched to depend on any picture in the same sub-layer prior to the point in the bitstream at which the switch was performed. Thus, the term "temporal sub-layer switching point" may refer to a picture that has no dependency on any other picture that is in the same sub-layer as the picture and that precedes the picture in decoding order.

SVC, MVC, MVC plus depth (MVC+D) (3D-HEVC), and HEVC version 1 specify a sub-bitstream extraction process. For example, clause 10 of HEVC version 1 specifies a sub-bitstream extraction process. In HEVC version 1, the sub-bitstream extraction process takes a bitstream, a target highest temporal identifier, and a target layer set as inputs. Furthermore, in HEVC version 1, the sub-bitstream extraction process provides a sub-bitstream as output. The sub-bitstream provided by the sub-bitstream extraction process does not include VCL NAL units that do not belong to the target layer set and does not include VCL NAL units having temporal identifiers greater than the target highest temporal identifier. In some examples, each extractable sub-bitstream is required to be a conforming bitstream.

One issue that has been considered in the design of the bitstream extraction process, e.g. in MVC development, is whether to target the best sub-bitstream self-completeness or the optimal size of a sub-bitstream. If a sub-bitstream is extracted targeting sub-bitstream self-completeness, each sub-bitstream further extracted from the sub-stream, recursively, can be a conforming bitstream. If a sub-bitstream is extracted targeting optimal size, some or all pictures that are not needed for correct decoding of the target output layers do not have to be included in the extracted sub-bitstream.

Targeting best self-completeness may make the bitstream extraction process easier to specify. A self-complete sub-bitstream is still "fully extractable" and is more useful if the bitstream extraction is performed by a streaming server or an intermediate network element and each subset of the bitstream may be further requested by some end users. However, on the other hand, if the extracted sub-bitstream is directly sent to end users and is not supposed to be further extracted, better transmission bandwidth efficiency can be achieved by targeting the optimal size of the bitstream. Such a sub-bitstream generated by targeting the optimal size is considered as "optimal extracted." To enable either advantage to be applied depending on applications, the sub-bitstream extraction process can be designed to adaptively choose the best extraction operation.

Wang et al., "MV-HEVC/SHVC HLS: On changing of the highest layer ID across AUs and multi-mode bitstream extraction," Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, document no. JCTVC-N0267, and Joint Collaborative Team on 3D Video Coding Extensions of ITU-T SG 16 WP 3 and ISO/IEC JTC 1/SC 29/WG 11, 5th Meeting: Vienna, AT, 27 Jul.-2 Aug. 2013, document no. JCT3V-E0087 (hereinafter, "JCTVC-N0267/JCT3V-E0087") proposed supporting multi-mode bitstream extractions. JCTVC-N0267/JCT3V-E0087 proposed the following changes to subclause 10 of the HEVC WD (with additions being underlined (e.g., "added text"), and removals indicated in italics with double square brackets (e.g., "[[deleted text]]")).

Sub-bitstream extraction process Inputs to this process are a bitstream, a target highest TemporalId value tIdTarget. [[and]] a target layer identifier list layerIdListTarget, a target output layer identifier list TargetOptLayerIdList. and an extraction mode subExtModeIdc, which is specified by an external means when present, or set equal to 0 when not specified by an external means. Output of this process is a sub-bitstream.

It is a requirement of bitstream conformance for the input bitstream that any output sub-bitstream of the process specified in this subclause with tIdTarget equal to any value in the range of 0 to 6, inclusive, and layerIdListTarget equal to the layer identifier list associated with a layer set specified in the active video parameter set shall be a conforming bitstream when subExtModeIdc is equal to 0.

NOTE 1—A conforming bitstream contains one or more coded slice segment NAL units with nuh_layer_id equal to 0 and TemporalId equal to 0.

The output sub-bitstream is derived as follows:

When one or more of the following two conditions are true, remove all Supplemental Enhancement Information (SEI) NAL units that have nuh_layer_id equal to 0 and that contain a non-nested buffering period SEI message, a non-nested picture timing SEI message, or a non-nested decoding unit information SEI message:

layerIdListTarget does not include all the values of nuh_layer_id in all NAL units in the bitstream.

tIdTarget is less than the greatest TemporalId in all NAL units in the bitstream.

NOTE 2—A "smart" bitstream extractor may include appropriate non-nested buffering picture SEI messages, non-nested picture timing SEI messages, and non-nested decoding unit information SEI messages in the extracted sub-bitstream, provided that the SEI messages applicable to the sub-bitstream were present as nested SEI messages in the original bitstream.

Remove all NAL units with TemporalId greater than tIdTarget or nuh_layer_id not among the values included in layerIdListTarget.

When subExtModeIdc is greater than 0, further remove NAL units with nuh_layer_id not among the values included in TargetOptLayerIdList and with a TemporalId greater than max_tid_il_ref_pics_plus1[LayerIdxInVps[nuh_layer_id]]−1.

When subExtModeIdc is greater than 1, further remove NAL units with nuh_layer_id not among the values included in TargetOptLayerIdList and discardable_flag equal to 1.

discardable_flag is a syntax element included in a slice segment header. As defined in MV-HEVC WD5, discardable_flag equal to 1 specifies that a coded picture is not used as a reference picture for inter prediction and is not used as an inter-layer reference picture in the decoding process of subsequent pictures in decoding order. discardable_flag equal to 0 specifies that the coded picture may be used as a reference picture for inter prediction and may be used as an inter-layer reference picture in the decoding process of subsequent pictures in decoding order. When not present, the value of discardable_flag is inferred to be equal to 0.

The multi-mode bitstream extraction process as proposed in JCTVC-N0267 and JCT3V-E0087 potentially has the following problems. First, the multi-mode bitstream extraction process produces multiple sub-bitstreams with the same input of a target layer identifier list and a target temporalId. However, the multiple sub-bitstreams are not necessarily conforming bitstreams, therefore a conforming MV-HEVC/SHVC decoder might not able to decode some of the sub-bitstreams.

Second, the "fully extractable" sub-bitstreams may be used for bitstream extraction later with any possible modes. However. "optimal extracted" sub-bitstreams might be lack of some decoded pictures in some layers. Therefore, it might be impossible to extract certain output layer sets successfully from such a bitstream especially if the bitstream contains a layer which does not belong to a target output layer during the previous extraction process. Thus, what types of bitstream extractions may be performed on a bitstream should thus be indicated as a property of a bitstream.

Third, regardless of the bitstream extraction mode, the sub-bitstream contains sufficient NAL units to decode and output the pictures within the target output layer set. Therefore, further bitstream extraction for any mode is possible as long as the target output layer (TargetOptLayerIdList as in JCTVC-N0267/JCT3V-E0087) set does not exceed that used in previous extraction (and consequently the target layers (layerIdListTarget as in current HEVC and JCTVC-N0267/JCT3V-E0087) do not exceed the layers used in previous extraction). However, an extracted bitstream does not include information indicating which were the target layers and/or target output layer set used to produce the extracted bitstream.

Fourth, inputs to the bitstream extraction process proposed in JCTVC-N0267/JCT3V-E0087 include both target layers and output layer set. However, with the input of the output layer set, in the mode that does not to extract "fully extractable" sub-bitstream, the information of target layers becomes redundant. Even when the target layers are specified, it is not clear if each layer of the target layers can be clearly decoded due to the fact that some other layers that are dependent by the target layers are not included in the target layers, i.e., when the target layers are not self-contained. Therefore, in many scenarios, the presence of target layers, as an input for the bitstream extraction process is neither sufficient nor necessary.

The techniques of this disclosure may address one or more of the issues described above. A summary of the techniques of this disclosure is presented in below, and example implementations of the techniques of this disclosure are provided in the following section. Some of the techniques of this disclosure may be applied independently and some of the techniques of this disclosure may be applied in combination.

In accordance with a first example technique of this disclosure, an extraction level or conformance level indication may be introduced in a video codec as well as systems to specify the level of conformance for an operation point, which is also related to the fact that whether the bitstream associated with such an indication was produced through bitstream extraction and if yes, in which level. For example, the indication equal to 0 means the bitstream has not gone through a bitstream extraction process or was extracted with a mode of subExtModeIdc equal to 0. Such a value means the bitstream can be flexibly extracted with subExtModeIdc equal or larger than 0. In another example, the indication equal to 1 means the bitstream may have been produced by bitstream extraction process with a mode of subExtModeIdc equal to 1. Such a value means the bitstream cannot be extracted anymore, unless otherwise specified as in the third example technique of this disclosure, which is described below.

In accordance with a second example technique of this disclosure, sub-bitstreams extracted with each of the multiple extraction modes can be considered as conforming. In one aspect, as part of each conforming operation point, an output layer set is associated with a conformance level indication.

In another aspect of the second example technique of this disclosure, even for the same operation point as defined by a target output layer set and a target TemporalId, the contained coded pictures are different for sub-bitstreams extracted from different modes, it is therefore proposed to have the indication for the signaling of the Hypothetical Reference Decoder (HRD) parameters. A "hypothetical reference decoder" or "HRD" is a video buffering model. The HRD describes how data is to be buffered for decoding and how decoded data is buffered for output. For instance, the HRD describes the operation of a coded picture buffer ("CPB") and a decoded picture buffer ("DPB") in a video decoder. The CPB is a first-in first-out buffer containing access units in decoding order specified by HRD. The DPB is a buffer holding decoded pictures for reference, output reordering, or output delay specified by the HRD. A video encoder may signal a set of HRD parameters. The HRD parameters control various aspects of the HRD. The HRD parameters may include an initial CPB removal delay, a CPB size, a bit rate, an initial DPB output delay, and a DPB size. These HRD parameters may be coded in a hrd_parameters( ) syntax structure specified in a Video Parameter Set (VPS) and/or a Sequence Parameter Set (SPS). The HRD parameters may also be specified in buffering period SEI messages or picture timing SEI messages.

In H.264/AVC and HEVC, bitstream conformance and decoder conformance are specified as parts of the HRD specification. In other words, the HRD model specifies tests to determine whether a bitstream conforms to a standard and tests to determine whether a decoder conforms to the standard. Though the HRD is named as some kind of decoder, video encoders typically use the HRD to guarantee bitstream conformance, while video decoders typically do not need the HRD.

H.264/AVC and HEVC both specify two types of bitstream or HRD conformance, namely Type I and Type II. A Type I bitstream is a NAL unit stream containing only the VCL NAL units and filler data NAL unit for all access units in the bitstream. A Type II bitstream is a NAL unit stream that contains, in addition to the VCL NAL units and filler data NAL units for all access units in the bitstream, at least one of the following: additional non-VCL NAL units other than filler data NAL units; and all leading_zero_8bits, zero_byte, start_coded_prefix_one_3bytes, and trailing_zero_8bits syntax elements that form a byte stream from the NAL unit stream.

When a device performs a bitstream conformance test that determines whether a bitstream conforms to a video coding standard, the device may select an operation point of the bitstream. The device may then determine a set of HRD parameters applicable to the selected operation point. The device may use the set of HRD parameters applicable to the selected operation point to configure the behavior of the HRD. More particularly, the device may use the applicable set of HRD parameters to configure the behaviors of particular components of the HRD, such as a hypothetical stream scheduler (HSS), the CPB, a decoding process, the DPB, and so on. Subsequently, the HSS may inject coded video data of the bitstream into the CPB of the HRD according to a particular schedule. Furthermore, the device may invoke a decoding process that decodes the coded video data in the CPB. The decoding process may output decoded pictures to the DPB. As the device moves data through the HRD, the device may determine whether a particular set of constraints remain satisfied. For example, the device may determine whether an overflow or underflow condition occurs in the CPB or DPB while the HRD is decoding the operation point representation of the selected operation point. The device may select and process each operation point of the bitstream in this manner. If no operation point of the bitstream causes the constraints to be violated, the device may determine that the bitstream conforms to the video coding standard.

Both H.264/AVC and HEVC specify two types of decoder conformance, namely output timing decoder conformance and output order decoder conformance. A decoder claiming conformance to a specific profile, tier and level is able to successfully decode all bitstreams that conform to the bitstream conformance requirements of a video coding standard, such as HEVC. In this disclosure, a "profile" may refer to a subset of the bitstream syntax. "Tiers" and "levels" may be specified within each profile. A level of a tier may be a specified set of constraints imposed on values of the syntax elements in the bitstream. These constraints may be simple limits on values. Alternatively, the constraints may take the form of constraints on arithmetic combinations of values (e.g., picture width multiplied by picture height multiplied by number of pictures decoded per second). Typically, a level specified for a lower tier is more constrained than a level specified for a higher tier.

In accordance with a third example technique of this disclosure, for each sub-bitstream produced by a bitstream extraction operation, an SEI message may be produced to indicate which extraction mode has been used to produce the sub-bitstream. In other words, a computing device may include, in a sub-bitstream that includes a coded representation of video data, a SEI message that includes an indication of an extraction mode that was used to produce the sub-bitstream. In addition or alternatively, for such a sub-bitstream, the target output layer set that was used to produce the sub-bitstream may be signaled in the SEI message.

Thus, in some examples, a computing device (e.g., destination device 14, intermediate device 19) may obtain, from a first bitstream that includes a coded representation of the video data, a SEI message that includes an indication of an extraction mode that was used to extract the first bitstream from a second bitstream. In such examples, the first bitstream is a sub-bitstream extracted from the second bitstream according to the extraction mode. Regardless of whether the extraction mode is a first extraction mode or a second extraction mode, the first bitstream includes sufficient NAL units to decode and output pictures in a target output layer set for the first bitstream. If the extraction mode is the first extraction mode (e.g., the first bitstream is a fully-extractable sub-bitstream), the first bitstream includes one or more coded pictures not needed for correct decoding of the target output layer set (e.g., pictures with discardable_flag equal to 1). If the extraction mode is the second mode (e.g., the first bitstream is a size-optimized sub-bitstream), the first bitstream does not include the one or more coded pictures not needed for correct decoding of the target output layer set. Similarly, a computing device (e.g., source device 12, intermediate device 19) may generate and include, in a first bitstream that includes a coded representation of video data, a SEI message that includes an indication of an extraction mode that was used to extract the first bitstream from a second bitstream.

In some examples, if the extraction mode is the first extraction mode, the first bitstream excludes NAL units of the second bitstream that have temporal identifiers greater than a target temporal identifier and have layer identifiers not among values included in a target output layer set for the target output layer set. Furthermore, if the extraction mode is the second extraction mode, the first bitstream further excludes NAL units of the second bitstream that correspond to any coded pictures that are not needed for correct decoding of layers in the target output layer set.

With such an SEI message, even though "fully extractable" bitstream extraction cannot be applied for all containing layers, all extraction modes can be applied as long as the target output layer set as an input does not exceed the signaled target output layer set. Thus, in some examples, a computing device may determine that a fully-extractable sub-bitstream can be extracted from a bitstream, so long as a target output layer set for the fully-extractable sub-bitstream does not exceed the target output layer set for the bitstream. The fully-extractable sub-bitstream contains sufficient NAL units to decode pictures within the target output layer set for the fully-extractable sub-bitstream. Alternatively, at least such an indication of conformance level (or extraction mode) can be present in profile_tier_level syntax structure, wherein the indication is present by utilizing the reserved bits.

Alternatively, such an indication can be provided through external means, e.g. as an ISO base media file format metadata (e.g., an indication in the sample description) that is associated with the elementary stream corresponding to such a sub-bitstream. Thus, a computing device may obtain, through external means, an indication of an extraction mode that was used to produce the bitstream. If the indication indicates that the bitstream was produced using a first extraction mode, a conforming second sub-bitstream is extractable from the bitstream. If the indication indicates that the bitstream was produced using a second, different extraction mode, no conforming sub-bitstream is extractable from the bitstream. The external means may be a source of information that is not included in the bitstream.

In accordance with a fourth example technique of this disclosure, an umbrella bitstream extraction process can be defined in a multi-layer codec, e.g., MV-HEVC or SHVC. The umbrella bitstream extraction process eventually invokes a bitstream extraction process as defined in HEVC or as defined in JCTVC-N0267/JCT3V-E0087. The umbrella bitstream extraction process takes the inputs including a target output layer set, a target TemporalId, and a bitstream extraction mode. Among them, the target output layer set is used to derive the target layers (layerIdListTarget), the derived target layers as well as other inputs are used as the input for the bitstream extraction process as defined in HEVC or JCTVC-N0267/JCT3V-E0087. Alternatively, in addition, even when such an umbrella bitstream extraction is defined based mainly on the output layer set, rather than the target layers, the HEVC version 1 fashion of extraction process is still considered available. Therefore, it is possible that a sub-bitstream, after extraction, does not necessarily correspond to one operation point. Instead, the sub-bitstream is a union of multiple operation points. Such HEVC version 1 fashion of extraction process may be invoked when the bitstream extraction mode is 0 and in such a case, the output layer set is ignored.

In accordance with a fifth example technique of this disclosure, in an ISO base media file format or MPEG-2 TS, a box or descriptor that describes an operation point represented with at least an output layer set, an extraction level indication can be signaled.

In accordance with one or more of the techniques of this disclosure, the following indicate proposed changes to subclause 10 of the HEVC WD (with additions being underlined (e.g., "added text"), and removals indicated in italics with double square brackets (e.g., "[[deleted text]]")).

Inputs to this process are a bitstream, a target highest TemporalId value tIdTarget, [[and]] a target layer identifier list layerIdListTarget, an extraction mode subExtModeIdc, and a target output layer identifier list TargetOptLayerIdList if subExtModeIdc is not equal to 0.

Output of this process is a sub-bitstream.

It is a requirement of bitstream conformance for the input bitstream that any output sub-bitstream of the process specified in this subclause with tIdTarget equal to any value in the range of 0 to 6, inclusive, and layerIdListTarget equal to the layer identifier list associated with a layer set specified in the active video parameter set shall be a conforming bitstream when subExtModeIdc is less than 3.

NOTE 1—A conforming bitstream contains one or more coded slice segment NAL units with nuh_layer_id equal to 0 and TemporalId equal to 0.

The output sub-bitstream is derived as follows:

When one or more of the following two conditions are true, remove all SEI NAL units that have nuh_layer_id equal to 0 and that contain a non-nested buffering period SEI message, a non-nested picture timing SET message, or a non-nested decoding unit information SET message:

layerIdListTarget does not include all the values of nuh_layer_id in all NAL units in the bitstream.

tIdTarget is less than the greatest TemporalId in all NAL units in the bitstream.

NOTE 2—A "smart" bitstream extractor may include appropriate non-nested buffering picture SEI messages, non-nested picture timing SEI messages, and non-nested decoding unit information SEI messages in the extracted sub-bitstream, provided that the SEI messages applicable to the sub-bitstream were present as nested SEI messages in the original bitstream.

Remove all NAL units with TemporalId greater than tIdTarget or nuh_layer_id not among the values included in layerIdListTarget.

When subExtModeIdc is greater than 0, further remove NAL units with nuh_layer_id not among the values included in TargetOptLayerIdList and with a TemporalId greater than max_tid_il_ref_pics_plus1[LayerIdxInVps[nuh_layer_id]]−1.

When subExtModeIdc is greater than 1, further remove NAL units with nuh_layer_id not among the values included in TargetOptLayerIdList and discardable_flag equal to 1.

The version of subclause 10 of HEVC version 1 shown above differs from the version of subclause 10 of HEVC version 1 proposed in JCTVC-N0267/JCT3V-E0087 in that the target output layer identifier list TargetOptLayerIdList is provided as input to the sub-bitstream extraction process only if the extraction mode subExtModeInc is greater than 0. Furthermore, the version of subclause 10 of HEVC version 1 shown above differs from the version of subclause 10 of HEVC version 1 proposed in JCTVC-N0267/JCT3V-

E0087 in that the requirements for the input bitstream to be considered a conforming bitstream are different.

In accordance with some techniques of this disclosure, multiple conformance levels are signaled for output layer sets in a VPS. For instance, a video encoder or other computing device may signal multiple conformance levels for output layer sets in a VPS. Table 1, below, indicates example changes to VPS extension syntax described in subclause F.7.3.2.1.1 of SHVC WD3 (with syntax elements indicated in bold (e.g., "syntax element") and additions being underlined (e.g., "added text")).

TABLE 1

| | Descriptor |
|---|---|
| vps_extension( ) { | |
|   avc_base_layer_flag | u(1) |
|   vps_vui_offset | u(16) |
|   splitting_flag | u(1) |
|   for( i = 0, NumScalabilityTypes = 0; i < 16; i++ ) { | |
|     scalability_mask_flag[ i ] | u(1) |
|     NumScalabilityTypes += scalability_mask_flag[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 1; i <= vps_max_layers_minus1; i++ ) { | |
|     if( vps_nuh_layer_id_present_flag ) | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
|   } | |
|   if( NumViews > 1 ) | |
|     view_id_len_minus1 | u(4) |
|   for( i = 0; i < NumViews; i++ ) | |
|     view_id_val[ i ] | u(v) |
|   for( i = 1; i <= vps_max_layers_minus1; i++ ) | |
|     for( j = 0; j < i; j++ ) | |
|       direct_dependency_flag[ i ][ j ] | u(1) |
|   max_tid_ref_present_flag | u(1) |
|   if( max_tid_ref_present_flag ) | |
|     for( i = 0; i < vps_max_layers_minus1; i++ ) | |
|       max_tid_il_ref_pics_plus1[ i ] | u(3) |
|   all_ref_layers_active_flag | u(1) |
|   vps_number_layer_sets_minus1 | u(10) |
|   vps_num_profile_tier_level_minus1 | u(6) |
|   for( i = 1; i <= vps_num_profile_tier_level_minus1; i ++ ) { | |
|     vps_profile_present_flag[ i ] | u(1) |
|     if( !vps_profile_present_flag[ i ] ) | |
|       profile_ref_minus1[ i ] | u(6) |
|     profile_tier_level( vps_profile_present_flag[ i ], vps_max_sub_layers_minus1 ) | |
|   } | |
|   numOutputLayerSets = vps_number_layer_sets_minus1 + 1 | |
|   more_output_layer_sets_than_default_flag | u(1) |
|   if( more_output_layer_sets_than_default_flag ) { | |
|     num_add_output_layer_sets_minus1 | u(10) |
|     numOutputLayerSets += num_add_output_layer_sets_minus1 + 1 | |
|   } | |
|   if( numOutputLayerSets > 1 ) | |
|     default_one_target_output_layer_flag | u(1) |
|   for( <u>NumConformancePoints=0</u>, i = 1; i < numOutputLayerSets; i++ ) { | |
|     if( i > vps_number_layer_sets_minus1 ) { | |
|       output_layer_set_idx_minus1[ i ] | u(v) |
|       lsIdx = output_layer_set_idx_minus1[ i ] + 1 | |
|       for( j = 0; j < NumLayersInIdList[ lsIdx ] − 1; j++) | |
|         output_layer_flag[ i ][ j ] | u(1) |
|     } | |
|     <u>num_present_conformance_level_minus1[ i ]</u> | <u>u(2)</u> |
|     NumConformancePoints += num_present_conformance_level_minus1[ i ] | |
|     <u>for ( j =0; j<= num_present_conformance_level_minus1[ i ]; j++) {</u> | |
|       <u>if( num_present_conformance_level_minus1[ i ] < 2 )</u> | |
|         <u>conform_level[ i ][ j ]</u> | <u>u(2)</u> |
|       <u>profile_level_tier_idx[ i ][ j ]</u> | <u>u(v)</u> |
|     <u>}</u> | |
|   } | |
|   add_vps_num_hrd_parameters | u(v) |
|   for ( i = 0; i < add_vps_num_hrd_parameters; i++ ) { | |
|     hrd_output_layer_set_idx[ i ] | ue(v) |
|     if( num_present_conformance_level_minus1[ hrd_output_layer_set_idx[ i ] ] > 0 ) | |
|       vps_ext_hrd_conformance_level_idx[ i ] | u(2) |
|     add_cprms_present_flag[ i ] | u(1) |

TABLE 1-continued

| vps_extension( ) { | Descriptor |
|---|---|
|     hrd_parameters( add_cprms_present_flag[ i ], vps_max_sub_layers_minus1 ) | |
|   } | |
|   rep_format_idx_present_flag | u(1) |
|   if( rep_format_idx_present_flag ) | |
|     vps_num_rep_formats_minus1 | u(4) |
|   for( i = 0; i <= vps_num_rep_formats_minus1; i++ ) | |
|     rep_format( ) | |
|   if( rep_format_idx_present_flag ) | |
|     for (i = 1; i <= vps_max_layers_minus1; i++ ) | |
|       if( vps_num_rep_formats_minus1 > 0 ) | |
|         vps_rep_format_idx[ i ] | u(4) |
|   max_one_active_ref_layer_flag | u(1) |
|   cross_layer_irap_aligned_flag | u(1) |
|   direct_dep_type_len_minus2 | ue(v) |
|   for( i = 1; i <= vps_max_layers_minus1; i++ ) | |
|     for( j = 0; j < i; j++ ) | |
|       if( direct_dependency_flag[ i ][ j ] ) | |
|         direct_dependency_type[ i ][ j ] | u(v) |
|   single_layer_for_non_irap_flag | u(1) |
|   vps_vui_present_flag | u(1) |
|   if( vps_vui_present_flag ) { | |
|     while( !byte_aligned( ) ) | |
|       vps_vui_alignment_bit_equal_to_one | u(1) |
|     vps_vui( ) | |
|   } | |
| } | |

In this disclosure, syntax elements having type descriptors of the form u(n), where n is an integer, are unsigned values using n bits. Syntax elements having type descriptors of the form u(v) are unsigned values whose length varies in a manner dependent on the values of other syntax elements. Furthermore, syntax elements having type descriptors of the form ue(v) are unsigned integer 0-th order Exp-Golomb coded syntax elements with left bit first.

In Table 1, above, num_present_conformance_level_minus1[i] plus 1 specifies the number of conformance levels for the i-th output layer set. The value of num_present_conformance_level_minus 1 [i] is in the range of 0 to 2, inclusive. Furthermore, in Table 1, conform_level[i][j] specifies the j-th conformance level present for the i-th output layer set. When not present, conform_level[i][j] is inferred to be equal to j.

Furthermore, with regard to the example of Table 1, let outLayerSet be the output layer set and presentLayerset be the layer set present for the output layer set to be decoded, let maxTid be the greatest values of TemporalId of pictures in layers of the presentLayerset. A conformance level value equal to 0 indicates that the highest TemporalId value of each layer in presentLayerset is equal to maxTid, and each access unit contains one picture from each layer in presentLayerset. A conformance level value equal to 1 indicates that the highest TemporalId value of each layer in outLayerSet is equal to maxTid, and each access unit contains one picture from each layer in outLayerSet; in addition, for each layer A within presentLayerset but not in outLayerSet, if the highest TemporalId of pictures in this layer is maxTidPreLayer, in each access unit with a TemporalId smaller than or equal to maxTidPreLayer, a picture in layer A is present in the access unit. A conformance level value equal to 1 indicates the highest TemporalId value of each layer in outLayerSet is equal to maxTid, and each access unit contains one picture from each layer in outLayerSet.

Thus, in the example of the previous paragraph, the conform_level syntax element (i.e., an indication of the extraction mode that was used to produce a bitstream) indicates a conformance level. The conformance level equal to 0 indicates that a highest temporal identifier of each layer in a present layer set is equal to a maximum temporal identifier of the present layer set and that each access unit of the sub-bitstream contains one picture from each layer in the present layer set. Furthermore, the present layer set is a set of layers present for the sub-bitstream. The maximum temporal identifier of the present layer set is a greatest temporal identifier of pictures in layers in the present layer set. Additionally, the conformance level equal to 1 indicates that a highest temporal identifier of each layer in a target output layer set is equal to the maximum temporal identifier of the present layer set and each access unit of the sub-bitstream contains one picture from each layer in the target output layer set. The conformance level equal to 1 further indicates that for each respective layer in the present layer set that is not in the target output layer set, if a highest temporal identifier of pictures in the respective layer is the maximum temporal identifier of the present layer set, each access unit with a temporal identifier smaller than or equal to the maximum temporal identifier of the present layer set includes a picture in the respective layer. Regardless of the extraction mode, the sub-bitstream contains sufficient NAL units to decode pictures within the output layer set.

In some examples, conformance level value equal to 1 or 2 or both may not require the following: the highest TemporalId value of each layer in outLayerSet is equal to maxTid and each access unit contains one picture from each layer in outLayerSet.

Alternatively, in some examples, conformance level 1 is defined as follows: a conformance level value equal to 1 indicates that for each layer A within presentLayerset, if the highest TemporalId of pictures in this layer is maxTidPreLayer, in each access unit with a TemporalId smaller than or equal to maxTidPreLayer, a picture in layer A is present in the access unit.

Thus, in the example of the previous paragraph, the conform_level syntax element indicates a conformance level. The conformance level equal to 0 indicates that a highest temporal identifier of each layer in a present layer set is equal to a maximum temporal identifier of the present layer set and that each access unit of the sub-bitstream contains one picture from each layer in the present layer set. The present layer set is a set of layers present for the sub-bitstream. The maximum temporal identifier of the present layer set is a greatest temporal identifier of pictures in layers in the present layer set. Additionally, in this example, the conformance level equal to 1 indicates that, for each respective layer in the present layer set, if a highest temporal identifier of pictures in the respective layer is the maximum temporal identifier of the present layer set, each access unit with a temporal identifier smaller than or equal to the maximum temporal identifier of the present layer set includes a picture in the respective layer. Regardless of the extraction mode, the sub-bitstream contains sufficient NAL units to decode pictures within the output layer set.

Furthermore, in Table 1, profile_level_tier_idx[i][j] specifies the index, into the list of profile_tier_level( ) syntax structures in the VPS, of the profile_tier_level( ) syntax structure that applies to i-th output layer set with the j-th conformance level. The length of the profile_level_tier_idx [i] syntax element is Ceil(Log 2(vps_num_profile_tier_level_minus1+1)) bits. The value of profile_level_tier_idx[0] [0] is inferred to be equal to 0. The value of profile_level_tier_idx[i][j] shall be in the range of 0 to vps_num_profile_tier_level_minus 1, inclusive.

In Table 1, add_vps_num_hrd_parameters specifies the number of hrd_parameters( ) syntax structures present in the VPS extension of the VPS RBSP. Furthermore, hrd_output_layer_set_idx[i] specifies the index, into the output layer sets specified by the VPS, of the layer set to which the i-th hrd_parameters( ) syntax structure in the VPS extension applies. hrd_output_layer set_idx[i] is in the range of 0 to 1023, inclusive, to appear in the syntax.

Additionally, in Table 1, vps_ext_hrd_conformance_level_idx[i] specifies the index to the conformance level specified in VPS extension for the hrd_output_layer_set_idx[i]-th output layer set. When num_present_conformance_level_minus 1[hrd_output_layer_set_idx[i]] is equal to 0, vps_ext_hrd_conformance_level_idx[i] is derived to be equal to 0. The conformance level of the hrd_layer_set_idx[i]]-th output layer set, associated with the i-th hrd_parameters( ) syntax structure in the VPS is inferred to be equal to 0.

In Table 1, add_cprms_present_flag[i] equal to 1 specifies that the HRD parameters that are common for all sub-layers are present in the i-th hrd_parameters( ) syntax structure in the VPS extension. add_cprms_present_flag[i] equal to 0 specifies that the HRD parameters that are common for all sub-layers are not present in the i-th hrd_parameters( ) syntax structure in the VPS extension and are derived to be the same as the (i−1)-th hrd_parameters( ) syntax structure in the VPS extension. add_cprms_present_flag[0] is inferred to be equal to 1.

In some versions of MV-HEVC, characteristics are signaled for each layer set. Such characteristics for a layer set may include an average bit rate for the layer set, a maximum bit rate for the layer set, whether there is a constant picture rate for the layer set, an average picture rate for the layer set. Such characteristics may be signaled in a video usability information (VUI) extension of a VPS. In some instances, it may be desirable to signal such characteristics for each output layer set, which can have different conformance levels. Table 2, below, shows changes to the vps_vui syntax structure in accordance with one or more techniques of this disclosure, with syntax elements indicated in bold (e.g., "syntax element"), additions being underlined (e.g., "added text")), and deletions indicated in italics with double square brackets (e.g., "[[deleted text]]").

TABLE 2

| vps_vui( ){ | Descriptor |
|---|---|
|   bit_rate_present_vps_flag | u(1) |
|   pic_rate_present_vps_flag | u(1) |
|   if( bit_rate_present_vps_flag \|\| pic_rate_present_vps_flag ) | |
|     for( i = 0; i <[[= *vps_number_layer_sets_minus1*]] NumConformancePoints ; i++ ) | |
|       for( j = 0; j <= vps_max_sub_layers_minus1; j++ ) { | |
|         if( bit_rate_present_vps_flag ) | |
|           bit_rate_present_flag[ i ][ j ] | u(1) |
|         if( pic_rate_present_vps_flag ) | |
|           pic_rate_present_flag[ i ][ j ] | u(1) |
|         if( bit_rate_present_flag[ i ][ j ] ) { | |
|           avg_bit_rate[ i ][ j ] | u(16) |
|           max_bit_rate[ i ][ j ] | u(16) |
|         } | |
|         if( pic_rate_present_flag[ i ][ j ] ) { | |
|           constant_pic_rate_idc[ i ][ j ] | u(2) |
|           avg_pic_rate[ i ][ j ] | u(16) |
|         } | |
|       } | |
|   for( i = 1; i <= vps_max_layers_minus1; i++ ) | |
|     for( j = 0; j < NumDirectRefLayers[ layer_id_in_nuh[ i ] ]; j++ ) { | |
|       tile_boundaries_aligned_flag[ i ][ j ] | u(1) |
|   ilp_restricted_ref_layers_flag | u(1) |
|   if( ilp_restricted_ref_layers_flag ) | |
|     for( i = 1; i <= vps_max_layers_minus1; i++ ) | |
|       for( j = 0; j < NumDirectRefLayers[ layer_id_in_nuh[ i ] ]; j++ ) { | |
|         min_spatial_segment_offset_plus1[ i ][ j ] | ue(v) |
|         if( min_spatial_segment_offset_plus1[ i ][ j ] > 0 ) { | |
|           ctu_based_offset_enabled_flag[ i ][ j ] | u(1) |

TABLE 2-continued

| vps_vui( ){ | Descriptor |
|---|---|
|       if( ctu_based_offset_enabled_flag[ i ][ j ] ) | |
|         min_horizontal_ctu_offset_plus1[ i ][ j ] | ue(v) |
|     } | |
|   } | |
| } | |

In Table 2, the value of the NumConformancePoints variable may be determined as described in Table 1, above.

U.S. Provisional Patent Applications 61/889,515 and 61/890,841 proposed that the DPB size and other relevant syntax elements be present for each operation point (corresponding to an output layer set). In this document, such a signaling may be extended to various output layer sets with different conformance levels. In Table 3, below, syntax elements indicated in bold (e.g., "syntax element"), additions are indicated with underlining (e.g., "added text")), and deletions are indicated with italics in double square brackets (e.g., "[[deleted text]]").

TABLE 3

| dpb_size_table( ) { | |
|---|---|
|   for( i = 1; i < <u>NumConformancePoints</u>[[*NumOutputLayerSets*]]; i++ ) { | |
|     sub_layer_flag_info_present_flag[ i ] | u(1) |
|     for( j = 0; j <= vps_max_sub_layers_minus1; j++ ) { | |
|       if( j > 0 && sub_layer_flag_info_present_flag[ i ] && sub_layer_dpb_info_present_flag[ i ][ j − 1 ] ) | |
|         sub_layer_dpb_info_present_flag[ i ][ j ] | u(1) |
|       if( sub_layer_dpb_info_present_flag[ i ][ j ] ) { | |
|         for( k = 0; k < NumSubDpbs[ i ]; k++ ) | |
|           max_vps_dec_pic_buffering_minus1[ i ][ k ][ j ] | ue(v) |
|         max_vps_num_reorder_pics[ i ][ j ] | ue(v) |
|         max_vps_latency_increase_plus1[ i ][ j ] | ue(v) |
|       } | |
|     } | |
|   } | |
| } | |

As indicated above, in accordance with one or more technique of this disclosure, an indication of an extraction mode may be signaled in HRD parameters. In some examples, the HRD parameters may be signaled in an SEI message. For instance, for signaling of picture level HRD parameters in the buffering period SET message, the picture timing SEI message, and the decoding unit information SEI message, either the current scalable nesting SEI message is modified such that a nested SET message of any of these three types of SET message can be clearly indicated applicable to which of the conformance points. A buffering period SEI message is an SEI message that provides initial CPB removal delay and initial CPB removal delay offset information for initialization of the HRD at the position of the associated access unit (i.e., the access unit associated with the buffering period SEI message) in decoding order. A picture timing SEI message is an SEI message that provides CPB removal delay and DPB output delay information for the access unit associated with the SEI message. A decoding unit information SET message is an SET message that provides CPB removal delay information for the decoding unit associated with the SEI message. Table 4, below, shows an example syntax of a scalable nesting SEI message that is modified such that a nested buffering period SET message, a nested picture timing SET message, or a nested decoding unit information SET message can be clearly indicated as being applicable to particular conformance points.

TABLE 4

| scalable_nesting( payloadSize ) { | Descriptor |
|---|---|
|   bitstream_subset_flag | u(1) |
|   nesting_op_flag | u(1) |
|   if( nesting_op_flag ) { | |
|     default_op_flag | u(1) |
|     nesting_num_ops_minus1 | ue(v) |
|     for( i = default_op_flag; i <= nesting_num_ops_minus1; i++ ) { | |
|       nesting_max_temporal_id_plus1[ i ] | u(3) |
|       nesting_op_idx[ i ] | ue(v) |
|       <u>nesting_cp_cl[ i ]</u> | <u>u(2)</u> |
|     } | |
|   } else { | |
|     all_layers_flag | u(1) |
|     if( !all_layers_flag ) { | |
|       nesting_no_op_max_temporal_id_plus1 | u(3) |
|       nesting_num_layers_minus1 | ue(v) |
|       for( i = 0; 1 <= nesting_num_layers_minus1; i++ ) | |
|         nesting_layer_id[ i ] | u(6) |
|     } | |
|   } | |
|   while( !byte_aligned( ) ) | |
|     nesting_zero_bit /* equal to 0 */ | u(1) |
|   do | |
|     sei_message( ) | |
|   while( more_rbsp_data( ) ) | |
| } | |

In Table 4, above, nesting_cp_cl[i] specifies the conformance level of the nesting_cp_idx[i]-th output layer set specified by the active VPS to which the SEI messages contained in this SEI message applies. In some examples, the value of nesting_cp_cl[i] shall be greater than 0 and less than 3. In some examples, the value of nesting_cp_cl[i] shall be less than 3. The conformance level can be indicated as described in other examples of this disclosure.

Other example techniques of this disclosure provide for a new scalable nesting SEI message that is designed to achieve the same functionality as the SEI messages described above, but keep the existing scalable nesting SEI message untouched. Table 5, below, is an example set of syntax and semantics for such a new scalable nesting SEI message.

TABLE 5

| new_scalable_nesting( payloadSize ) { | Descriptor |
|---|---|
|   nesting_num_cps_minus1 | ue(v) |
|   for( i = 0; i <= nesting_num_cps_minus1; i++ ) { | |
|     nesting_cp_max_tid_plus1[ i ] | u(3) |
|     nesting_cp_idx[ i ] | ue(v) |
|     nesting_cp_cl[ i ] | u(2) |
|   } | |
|   while( !byte_aligned( ) ) | |
|     nesting_zero_bit /* equal to 0 */ | u(1) |
|   do | |

TABLE 5-continued

| new_scalable_nesting( payloadSize ) { | Descriptor |
|---|---|
| sei_message( ) | |
| while( more_rbsp_data( ) ) | |
| } | |

The scalable nesting SEI message of Table 5 provides a mechanism to associate SEI messages with bitstream subsets corresponding to various operation points. The new scalable nesting SEI message of Table 5 contains one or more SEI messages. In some examples, the new scalable nesting SEI message of Table 5 shall not be contained in another SEI message.

In the example of Table 5, the new scalable nesting SEI message shall not contain any other SEI messages than the buffering period SEI message, the picture timing SEI message, and the decoding unit information SEI message. Furthermore, in Table 5, nesting_num_cps_minus1 plus 1 specifies the number of the following nesting_cp_idx[i] syntax elements. The value of nesting_num_cps_minus1 shall be in the range of 0 to 2047, inclusive. Alternatively, the value of nesting_num_cps_minus1 shall be in the range of 0 to 3071, inclusive. Furthermore, the variable nestingNumCps is set equal to nesting_num_cps_minus1+1.

In Table 5, nesting_cp_max_tid_plus1[i] is used to specify the variable maxTemporalId[i]. The value of nesting_cp_max_tid_plus1[i] shall be greater than or equal to nuh_temporal_id_plus1 of the current SEI NAL unit. The variable maxTemporalId[i] is set equal to nesting_cp_max_tid_plus1[i]−1. nesting_cp_idx[i] specifies the index of the output layer set. The value of nesting_cp_idx[i] shall be in the range of 0 to 1023, inclusive, nesting_cp_cl[i] specifies the conformance level of the nesting_cp_idx[i]-th output layer set specified by the active VPS that the SEI messages contained in this SEI message apply to. The value of nesting_cp_cl[i] shall be greater than 0 and less than 3. Alternatively, the value of nesting_cp_cl[i] shall be less than 3.

The SEI messages contained in the new scalable nesting SEI message apply to sub-bitstreams subBitstream[i] for all i values in the range of 0 to nestingNumCps−1, inclusive, where each sub-bitstream subBitstream[i] is the output of the sub-bitstream extraction process (see below) with the bitstream. maxTemporalId[i], nesting_cp_idx[i], and nesting_cp_cl[i] as inputs, nesting_zero_bit shall be equal to 0.

Both of the two SEI messages (i.e., the scalable nesting of Table 4 and the new scalable nesting of Table 5) may have an extension bit inserted in a way similar to the sps_extension_flag in SPS. If such functionality is enabled in a scalable nesting SEI, nesting_cp_cl[i] can be signaled in the SEI extension as shown in Table 6, below.

TABLE 6

| | |
|---|---|
| If( nesting_op_flag ) | |
| for( i = default_op_flag; i <= nesting_num_ops_minus1; i++ ) | |
|    nesting_cp_cl[ i ] | u(2) |

An operation point may be identified by an index to the target output layer set specified by the VPS, a target HighestTid and a conformance level. Once a target operation point is selected for a bitstream conformance test, a bitstream extraction process, which is described in detail below, is invoked with the bitstream under test. HighestTid, the index to the target output layer set, and the conformance level as inputs, and the output sub-bitstream is assigned to BitstreamToDecode.

The hrd_parameters( ) syntax structure applicable to the target operation point, as specified in the VPS by hrd_output_layer_set_idx[i] and vps_ext_hrd_conformance_level_idx[i] are chosen, and the sub_layer_hrd_parameters( ) syntax structure applicable to the target operation point are further chosen based on the HighestTid.

For access unit 0, the buffering period SEI message that is applicable to the target operation point (as specified by the new scalable nesting SEI message) is selected. For each access unit in BitstreamToDecode starting from access unit 0, the picture timing SEI message that is associated with the access unit and applies to the target operation point (as specified by the new scalable nesting SEI message) is selected, and when SubPicHrdFlag is equal to 1 and sub_pic_cpb_params_in_pic_timing_sei_flag is equal to 0, the decoding unit information SEI messages that are associated with decoding units in the access unit (as specified by the new scalable nesting SEI message) and apply to the target operation point are selected.

As indicated above, in accordance with one or more techniques of this disclosure, for each sub-bitstream produced by a sub-bitstream extraction process, a computing device may generate an SEI message (e.g., a bitstream extraction status information SEI message) that indicates which extraction mode was used to produce the sub-bitstream. Table 7, below, shows an example syntax for such an SEI message.

TABLE 7

| bit_extr_status_info( payloadSize ) { | Descriptor |
|---|---|
|   lp_sei_active_vps_id | u(4) |
|   conformance_indication | u(2) |
|   output_layer_set_info_present_flag | u(1) |
|   if( output_layer_set_present_flag ) { | |
|     output_layer_set_from_vps_flag | u(1) |
|     if( output_layer_set_from_vps_flag ) | |
|       output_layer_set_idx_to_vps | u(v) |
|     else | |
|       for( i = 0; i <= vps_max_layers_minus1; i++ ) | |
|         output_layer_present_flag[ i ] | u(1) |
|   } | |
| } | |

When a bitstream extraction status information SET message, such as the SET message of Table 7, is present, the bitstream extraction status information SEI message is associated with a bitstream and indicates a conformance level to which the bitstream applies and indicates the target output layers of the bitstream. When output layer set information (e.g., output layer_set_from_vps_flag, output_layer_set_idx_to_vps, and/or output_layer_present_flag syntax elements) is present in the bitstream extraction status information SET message, a bitstream extraction process with any extraction mode can apply if the output layer set provided as input to the bitstream extraction process belongs to the output layer set as specified in the bitstream extraction status information SEI message. When output layer set information is not present in the bitstream extraction status information SEI message, or the bitstream extraction status information SEI message is not present, the output layers include all the layers signaled in the VPS (with layer_id_included_flag equal to 1). When the bitstream extraction status information SEI message is not present, the conformance level is inferred to be the lowest value of conform_level present in the VPS, for the output layer set which has all the layers signaled in VPS as output layers. The semantics of conform_level may be the same as described in other examples of this disclosure.

In Table 7, lp_sei_active_vps_id (which this disclosure may also refer to as active_vps_id) identifies the active VPS of the CVS containing this SEI message. The value of lp_sei_active_vps_id shall be equal to the value of vps_video_parameter_set_id of the active VPS for the VCL NAL units of the access unit containing the SEI message. conformance_indication specifies the conformance level of the bitstream associated with this SEI message. The conformance level may be defined in the same manner as described elsewhere in this disclosure.

Furthermore, in Table 7, output_layer_set_info_present_flag equal to 1 specifies the output layer set associated with this SEI message is defined in the VPS. In this way, the SEI message includes data indicating a target output layer set that was used to produce the bitstream. The data indicating the target output layer set that was used to produce the bitstream comprises a syntax element specifying an index to an output layer set specified in a VPS.

output_layer_set_info_present_flag equal to 0 specifies the output layer set associated with this SEI message may or may not be defined in the VPS. output_layer_set_idx_to_vps specifies the index to the output layer set as specified in the VPS. output_layer_present_flag[i] equal to 1 specifies that the value of nuh_layer_id equal to i is included in the output layer set associated with this SEI message. output_layer_present_flag[i][j] equal to 0 specifies that the value of nuh_layer_id equal to i is not included in the output layer set associated with this SEI message. In this way, the SEI message may include data indicating the target output layer set. This data may comprise a series of syntax elements (e.g., output_layer_present_flag syntax elements). For each respective syntax element in the series of syntax elements, a respective position index (e.g., i) for the respective syntax element indicates a location of the respective syntax element within the series of syntax elements. If a value of the respective syntax element is equal to 1, a layer having a layer identifier equal to the respective position index for the respective syntax element is included in the target output layer set that was used to produce the sub-bitstream. If a value of the respective syntax element is equal to 0, the layer having the layer identifier equal to the respective position index for the respective syntax element is not included in the target output layer set that was used to produce the sub-bitstream.

Thus, in some examples, the SEI message of Table 7 includes data indicating a target output layer set for a bitstream. Regardless of the extraction mode that was used to produce the bitstream, the bitstream contains sufficient NAL units to decode pictures within the target output layer set. Furthermore, if the bitstream was extracted using a second extraction mode (e.g., an extraction mode generating a size-optimized sub-bitstream), the bitstream was produced such that, for each respective NAL unit of a source bitstream, the respective NAL unit is removed from the source bitstream such that the respective NAL unit is not in the sub-bitstream if both of the following criteria are satisfied for the respective NAL unit:

i) the respective NAL unit has a layer identifier not among layer identifiers in a list of target output layer identifiers for the target output layer set, and ii) a temporal identifier of the respective NAL unit is greater than a maximum temporal identifier of inter-layer reference pictures used by pictures of a layer to which the respective NAL unit belongs.

Furthermore, in some examples, if the extraction mode is the second extraction mode, the respective NAL unit is removed from the source bitstream such that the respective NAL unit is not in the bitstream if:

i) the respective NAL unit has a layer identifier not among layer identifiers in a list of target output layer identifiers for the target output layer set, and ii) a flag of the respective NAL unit specifies that a coded picture corresponding to the respective NAL unit is not used as a reference picture in a decoding process of subsequent pictures in decoding order.

In some examples, the number of layers need to be decoded as well as which layers need to be decoded to output the output layer set can be derived based on VPS. Alternatively, such layers can be signaled in this SEI message.

As indicated above, in some examples of this disclosure, an indication of a conformance level may be present in a profile_tier_level syntax structure. Such a conformance level can be indicated in the profile, tier and level syntax structure, as shown below in Table 8.

TABLE 8

| profile_tier_level( profilePresentFlag, maxNumSubLayersMinus1 ) { | Descriptor |
|---|---|
| if( profilePresentFlag ) { | |
|   general_profile_space | u(2) |
|   general_tier_flag | u(1) |
|   general_profile_idc | u(5) |
|   for( j = 0; j < 32; j++ ) | |
|     general_profile_compatibility_flag[ j ] | u(1) |
|   general_progressive_source_flag | u(1) |
|   general_interlaced_source_flag | u(1) |
|   general_non_packed_constraint_flag | u(1) |
|   general_frame_only_constraint_flag | u(1) |
|   <u>conformance_level</u> | <u>u(2)</u> |
|   general_reserved_zero_42bits | u(<u>42</u>) |
| } | |
| general_level_idc | u(8) |
| for( i = 0; i < maxNumSubLayersMinus1; i++ ) { | |
|   sub_layer_profile_present_flag[ i ] | u(1) |
|   sub_layer_level_present_flag[ i ] | u(1) |
| } | |
| if( maxNumSubLayersMinus1 > 0 ) | |
|   for( i = maxNumSubLayersMinus1; i < 8; i++ ) | |
|     reserved_zero_2bits[ i ] | u(2) |
| for( i = 0; i < maxNumSubLayersMinus1; i++ ) { | |
|   if( sub_layer_profile_present_flag[ i ] ) { | |
|     sub_layer_profile_space[ i ] | u(2) |
|     sub_layer_tier_flag[ i ] | u(1) |
|     sub_layer_profile_idc[ i ] | u(5) |
|     for( j = 0; j < 32; j++ ) | |
|       sub_layer_profile_compatibility_flag[ i ][ j ] | u(1) |
|     sub_layer_progressive_source_flag[ i ] | u(1) |
|     sub_layer_interlaced_source_flag[ i ] | u(1) |
|     sub_layer_non_packed_constraint_flag[ i ] | u(1) |
|     sub_layer_frame_only_constraint_flag[ i ] | u(1) |
|     sub_layer_reserved_zero_44bits[ i ] | u(44) |
|   } | |
|   if( sub_layer_level_present_flag[ i ] ) | |
|     sub_layer_level_idc[ i ] | u(8) |
| } | |
| } | |

In Table 8, above, conformance_level specifies the conformance level to which the output layer set conforms. The conformance level may be defined in the same manner as described elsewhere in this disclosure.

As indicated above, in some examples of this disclosure, an umbrella bitstream extraction process can be defined in a multi-layer codec. In other words, an extraction process is defined in MV-HEVC/SHVC to enable the last input to be a combination of index to output layer set and a bitstream extraction mode, a combination of explicit output layer set and a bitstream extraction mode, or just a set of target layers.

When the last input is a set of target layers, the bitstream extraction mode is considered to be 0 and does not take an output layer set as input. The following is an example sub-bitstream extraction process in accordance with this example.

F.10 Sub-Bitstream Extraction Process
Inputs to this process are a bitstream, a target highest TemporalId value tIdTarget, and one of the following:
An index to output layer set outputLayerSetIdx and a bitstream extraction mode subExtModeIdc.
A target output layer identifier list inputOptLayerIdList and a bitstream extraction mode subExtModeIdc.
A target layer identifier list layerIdListTarget.
The input parameters to this sub-clause
If the last input includes an index to output layer set outputLayerSetIdx and a bitstream extraction mode subExtModeIdc, the target output layer identifier list TargetOptLayerIdList and layerIdListTarget are derived as follows:
If the last input includes an index to output layer set outputLayerSetIdx and a bitstream extraction mode subExtModeIdc, the target output layer identifier list TargetOptLayerIdList and layerIdListTarget are derived as follows:

```
lsIdx = outputLayerSetIdx;
layerIdListTarget = LayerSetLayerIdList[ lsIdx ].
for( k = 0, j = 0; j < NumLayersInIdList[ lsIdx ];j++) {
    layerIdListTarget[ j ] = LayerSetLayerIdList[ lsIdx ][ j ]
    if( output_layer_flag[ lsIdx ][ j ] )
        outputLayerSetIdx[ k++ ] = LayerSetLayerIdList[ lsIdx ][ j ]
}
```

Otherwise, if the last input includes a target output layer identifier list inputOptLayerIdList an bitstream extraction mode subExtModeIdc, the target output layer identifier list TargetOptLayerIdList is set to be equal to inputOptLayerIdList and the layerIdListTarget is derived to include the nuh_layer_id of any direct or indirect dependent layer of each layer as included in TargetOptLayerIdList, unless such a layer identifier has been included. Such a process is similar as in MVC bitstream extraction process.

Otherwise. TargetOptLayerIdList is set to be empty and subExtModeIdc is set to 0.

The Sub-bitstream extraction process as specified in section 4.1.1 applies with tIdTarget, layerIdListTarget and subExtModeIdc as inputs and if subExtModeIdc is not equal to 0, TargetOptLayerIdList if subExtModeIdc as an additional input.

Let the current bitstream has a conformance level of confLevel. When index to output layer set or target output layer identifier list is used as an input for bitstream extraction, any extraction mode (with value equal to 0 through 2) may apply. After the extraction process, the sub-bitstream has a Bitstream status information SEI message with conformance_indication equal to max (subExtModeIdc, confLevel).

When a target layer identifier list is used as input for bitstream extraction, after the extraction process, the sub-bitstream has a Bitstream status information SEI message with conformance_indication equal to confLevel (i.e., the conformance level does not change).

Video encoder 20 and video decoder 30 may implement one or more of the techniques of this disclosure described above. For example, video decoder 30 may obtain, based on data in a bitstream, an indication. The bitstream comprises an encoded representation of the video data. Video decoder 30 may determine, based at least in part on the indication, whether a sub-bitstream can be extracted from the bitstream. Similarly, video encoder 20 may produce a bitstream that includes data that provide an indication of whether a sub-bitstream can be extracted from the bitstream.

Additional examples of this disclosure include systems and methods to indicate the sub-bitstreams that are not conforming but can be provided for certain application scenarios, mainly to reduce the bandwidth.

As has been discussed in the 15$^{th}$ JCT-VC and 6$^{th}$ JCT-3V meetings, allowing extracted sub-bitstreams generated with multi-modes might not be the most suitable solution at this stage. However, considering such incomplete sub-bitstreams may still be useful for e.g., reduction of bandwidth for certain application scenarios, this disclosure proposes to indicate a picture presence property corresponding to the different extraction modes for all sub-bitstreams in an SEI message. This disclosure may refer to this SEI message as a sub-bitstream picture presence property SEI message. The features listed in the following examples may be used alone or in suitable combination depending on the implementation.

In some examples, an SEI message (e.g., a sub-bitstream picture presence property SEI message) is provided to indicate the properties of all sub-bitstreams that are not indicated in the VPS as conforming bitstreams, but sub-bitstreams that contain at least one access unit which does not contain pictures from all layers that are present in the sub-bitstream. For instance, an SEI message (e.g., a sub-bitstream picture presence property SEI message) may be provided to indicate the properties of all sub-bitstreams that are not indicated in the VPS as conforming bitstreams, but sub-bitstreams that contain at least one access unit that does not contain pictures from all layers that are present in the sub-bitstream. For each sub-bitstream, the level of the completeness of the sub-bitstream for the layers that are not target output layers is signalled. For each sub-bitstream, the maximum bitrate, average bitrate and average picture rate are signaled.

Table 9, below shows an example sub-bitstream picture presence property SEI message syntax in accordance with one or more techniques of this disclosure.

TABLE 9

| sub_bit_pic_presence_pro( payloadSize ) { | Descriptor |
| --- | --- |
| lp_sei_active_vps_id | u(4) |
| num_additional_sub_streams | u(10) |
| for( i = 0; i< num_additional_sub_streams; i++) { | |
| picture_presence_info_indication_minus1[ i ] | u(2) |
| output_layer_set_idx_to_vps[ i ] | u(10) |
| bit_rate_present_flag[ i ] | u(1) |
| pic_rate_present_flag[ i ] | u(1) |
| if( bit_rate_present_flag[ i ]) { | |
| avg_bit_rate[ i ] | u(16) |
| max_bit_rate[ i ] | u(16) |
| } | |
| if( pic_rate_present_flag[ i ] ) { | |

TABLE 9-continued

| sub_bit_pic_presence_pro( payloadSize ) { | Descriptor |
|---|---|
|     constant_pic_rate_idc[ i ] | u(2) |
|     avg_pic_rate[ i ][ j ] | u(16) |
|     } | |
|   } | |
| } | |

When the sub-bitstream picture presence property SEI message of Table 9 is present, it is associated with the bitstream and indicates for each of the sub-bitstreams, its picture presence level and bit-rates.

In the example of Table 9, lp_sei_active_vps_id identifies the active VPS of the CVS containing this SEI message. The value of lp_sei_active_vps_id shall be equal to the value of vps_video_parameter_set_id of the active VPS for the VCL NAL units of the access unit containing the SEI message. Furthermore, in the example of Table 9, num_additional_sub_streams specifies the number of the sub-bitstreams the properties of which are present in this SEI message.

picture_presence_info_indication_minus1[i] plus 1 specifies the picture presence level of the i-th sub-bitstream associated with this SEI message. The value of picture_p-resence_info_indication_minus1 [i] is in the range of 0 to 1, inclusive, and the value 2 and 3 are reserved. The value equal to 0 indicates that the following bit rate and picture rate information are for a sub-bitstream extracted according to the following process to the bitstream corresponding to the output layer set identified by output_layer_set_idx_to_vps[i]:

When one or more of the following two conditions are true, remove all SEI NAL units that have nuh_layer_id equal to 0 and that contain a non-nested buffering period SEI message, a non-nested picture timing SEI message, or a non-nested decoding unit information SEI message:
layerIdListTarget does not include all the values of nuh_layer_id in all NAL units in the bitstream.
tIdTarget is less than the greatest TemporalId in all NAL units in the bitstream.
Remove all NAL units with TemporalId greater than tIdTarget or nuh_layer_id not among the values included in layerIdListTarget.
Further remove NAL units with nuh_layer_id not among the values included in TargetOptLayerIdList and with a TemporalId greater than max_tid_il_ref_pics_plus1 [LayerIdxInVps[nuh_layer_id]]−1.

The value of picture_presence_info_indication_minus1 equal to 1 indicates that the following bit rate and picture rate information are for a sub-bitstream extracted according to the following process:

When one or more of the following two conditions are true, remove all SEI NAL units that have nuh_layer_id equal to 0 and that contain a non-nested buffering period SEI message, a non-nested picture timing SEI message, or a non-nested decoding unit information SEI message:
layerIdListTarget does not include all the values of nuh_layer_id in all NAL units in the bitstream.
tIdTarget is less than the greatest TemporalId in all NAL units in the bitstream.
Remove all NAL units with TemporalId greater than tIdTarget or nuh_layer_id not among the values included in layerIdListTarget.
Further remove NAL units with nuh_layer_id not among the values included in TargetOptLayerIdList and with a TemporalId greater than max_tid_il_ref_pics_plus1 [LayerIdxInVps[nuh_layer_id]]−1.
Further remove NAL units with nuh_layer_id not among the values included in TargetOptLayerIdList and discardable_flag equal to 1.

Furthermore, in the example of Table 9, output_layer_set_Idx_to_vps[i] specifies the index to the output layer set as specified in the VPS for the i-th sub-bitstream. bit_rate_present_flag[i] equal to 1 specifies that the bit rate information for the i-th sub-bistream is present. bit_rate_present_flag[i] equal to 0 specifies that the bit rate information for the i-th sub-bistream is not present. pic_rate_present_flag[i] equal to 1 specifies that picture rate information for the i-th sub-bistream is present is present. pic_rate_present_flag[i] equal to 0 specifies that picture rate information for the i-th sub-bistream is not present.

In the example of Table 9, avg_bit_rate[i] indicates the average bit rate of the i-th sub-bistream, in bits per second. The value is given by BitRateBPS(avg_bit_rate[i]) with the function BitRateBPS( ) being specified as follows:

$$\text{BitRateBPS}(x) = (x \,\&\, (2^{14}-1)) * 10^{(2+(x>>14))} \quad \text{(F-X)}$$

The average bit rate is derived according to the access unit removal time specified in clause F.13. In the following, bTotal is the number of bits in all NAL units of the i-th sub-bistream, $t_1$ is the removal time (in seconds) of the first access unit to which the VPS applies, and $t_2$ is the removal time (in seconds) of the last access unit (in decoding order) to which the VPS applies. With x specifying the value of avg_bit_rate[i], the following applies:

If $t_1$ is not equal to $t_2$, the following condition shall be true:

$$(x \,\&\, (2^{14}-1)) == \text{Round}(b\text{Total} \div ((t_2-t_1) * 10^{(2+(x>>14))})) \quad \text{(F-X+1)}$$

Otherwise ($t_1$ is equal to $t_2$), the following condition shall be true:

$$(x \,\&\, (2^{14}-1)) == 0 \quad \text{(F-X+2)}$$

Furthermore, in the example of Table 9, max_bit_rate[i] indicates an upper bound for the bit rate of the i-th sub-bitstream in any one-second time window of access unit removal time as specified in clause F.13. The upper bound for the bit rate in bits per second is given by BitRateBPS (max_bit_rate[i]). The bit rate values are derived according to the access unit removal time specified in clause F.13. In the following, $t_1$ is any point in time (in seconds), $t_2$ is set equal to $t_1+1 \div 100$, and bTotal is the number of bits in all NAL units of access units with a removal time greater than or equal to $t_1$ and less than $t_2$. With x specifying the value of max_bit_rate[i], the following condition shall be obeyed for all values of $t_1$:

$$(x \,\&\, (2^{14}-1)) >= b\text{Total} \div ((t_2-t_1) * 10^{(2+(x>>14))}) \quad \text{(F-X+3)}$$

In the example of Table 9, constant_pic_rate_idc[i] indicates whether the picture rate of the i-th sub-bistream is constant. In the following, a temporal segment tSeg is any set of two or more consecutive access units, in decoding order, of the i-th sub-bistream, auTotal(tSeg) is the number of access units in the temporal segment tSeg, $t_1(tSeg)$ is the removal time (in seconds) of the first access unit (in decoding order) of the temporal segment tSeg, $t_2(tSeg)$ is the removal time (in seconds) of the last access unit (in decoding order) of the temporal segment tSeg, and avgPicRate(tSeg) is the average picture rate in the temporal segment tSeg, and is specified as follows:

$$\text{avgPicRate}(t\text{Seg}) = \text{Round}(\text{auTotal}(t\text{Seg}) * 256 \div (t_2(t\text{Seg}) - t_1(t\text{Seg}))) \quad \text{(F-X+4)}$$

If the i-th sub-bistream only contains one or two access units or the value of avgPicRate(tSeg) is constant over all the temporal segments, the picture rate is constant; otherwise, the picture rate is not constant.

constant_pic_rate_idc[i] equal to 0 indicates that the picture rate of the i-th sub-bistream is not constant. constant_pic_rate_idc[i] equal to 1 indicates that the picture rate of the i-th sub-bistream is constant. constant_pic_rate_idc[i] equal to 2 indicates that the picture rate of the i-th sub-bistream may or may not be constant. The value of constant_pic_rate_idc[i] shall be in the range of 0 to 2, inclusive.

Furthermore, in the example of Table 9, avg_pic_rate[i] indicates the average picture rate, in units of picture per 256 seconds, of the i-th sub-bitstream. With auTotal being the number of access units in i-th sub-bitstream, $t_1$ being the removal time (in seconds) of the first access unit to which the VPS applies, and $t_2$ being the removal time (in seconds) of the last access unit (in decoding order) to which the VPS applies, the following applies:

If $t_1$ is not equal to $t_2$, the following condition shall be true:

$$\text{avg\_pic\_rate}[i] == \text{Round}(\text{auTotal} * 256 \div (t_2 - t_1)) \qquad \text{(F-X+5)}$$

Otherwise ($t_1$ is equal to $t_2$), the following condition shall be true:

$$\text{avg\_pic\_rate}[i] == 0 \qquad \text{(F-X+6)}$$

Figure 2:
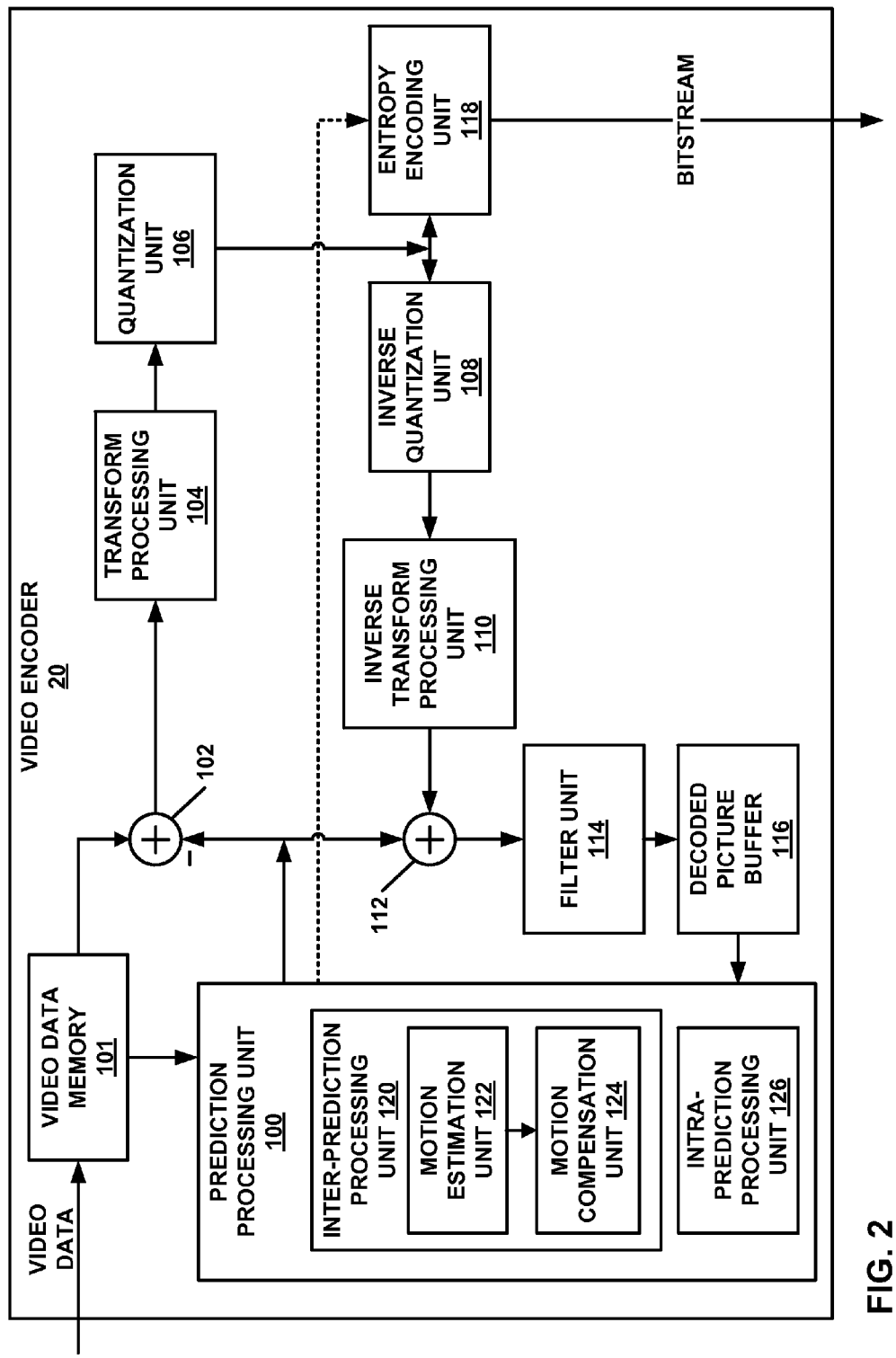
FIG. 2 is a block diagram illustrating an example video encoder.

FIG. 2 is a block diagram illustrating an example video encoder 20. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a prediction processing unit 100, a video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may encode each CTU in a slice of a picture of the video data. In some examples, each of the CTUs may be associated with equally-sized luma coding tree blocks (CTBs) and corresponding chroma CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive blocks for the PU. When performing intra prediction using a particular intra prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on coding blocks (e.g., luma, Cb and Cr coding blocks) of a CU and the selected predictive blocks (e.g., predictive luma, Cb and Cr blocks) of the PUs of the CU, residual blocks (e.g., luma, Cb and Cr residual blocks) of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118.

In accordance with at least some examples of this disclosure, video encoder 20 of FIG. 2 may include, in a first bitstream that includes a coded representation of the video data, a SEI message that includes an indication of an extraction mode that was used to extract the first bitstream from a second bitstream. If the extraction mode is the first extraction mode, the first bitstream includes one or more coded pictures not needed for correct decoding of the target output layer set. If the extraction mode is the second extraction mode, the first bitstream does not include the one or more coded pictures not needed for correct decoding of the target output layer set.

Figure 3:
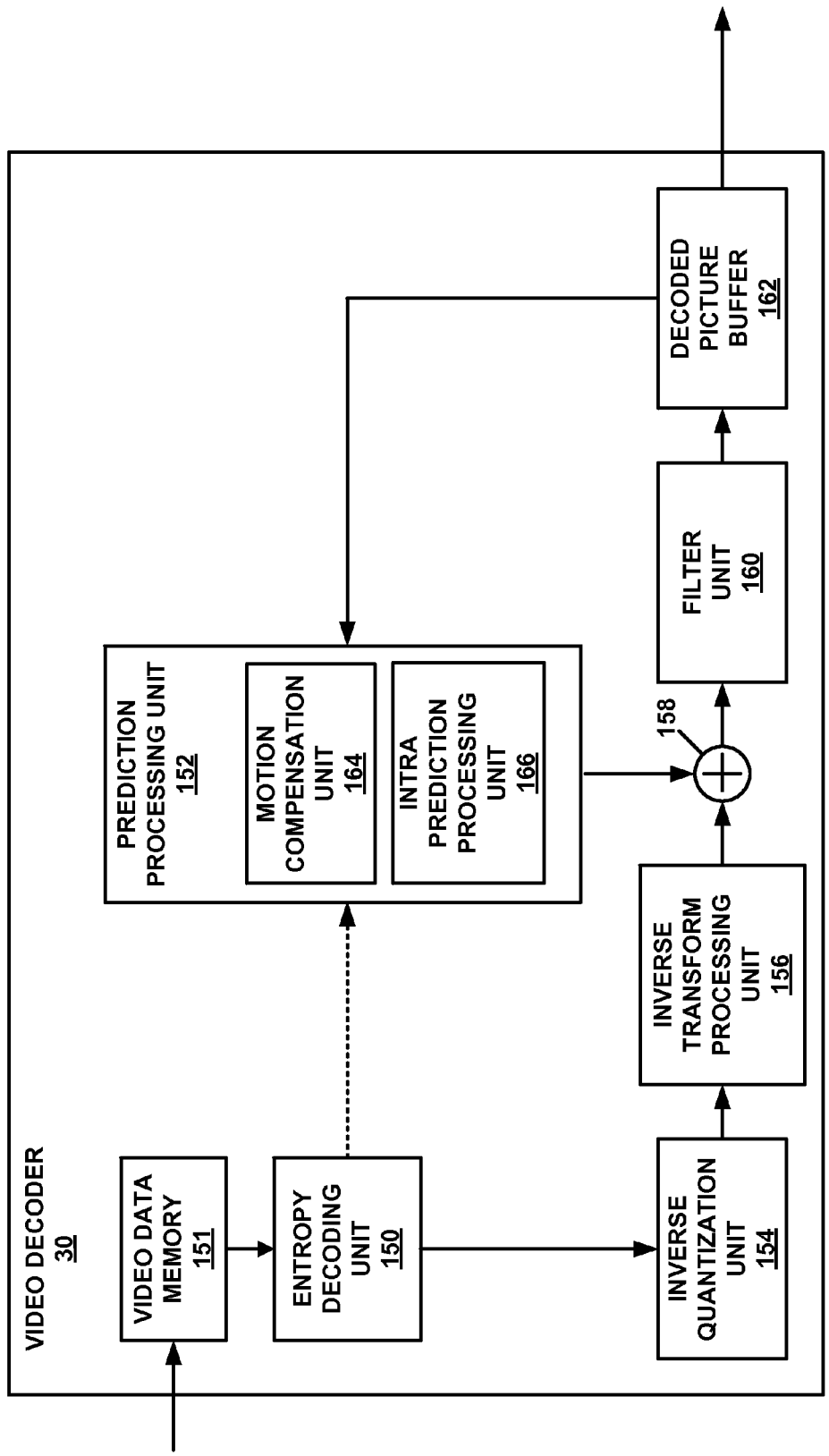
FIG. 3 is a block diagram illustrating an example video decoder.

FIG. 3 is a block diagram illustrating an example video decoder 30. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

A coded picture buffer (CPB) 151 may receive and store encoded video data (e.g., NAL units) of a bitstream. The video data stored in CPB 151 may be obtained, for example, from channel 16, e.g., from a local video source, such as a camera, via wired or wireless network communication of video data, or by accessing physical data storage media. CPB 151 may form a video data memory that stores encoded video data from an encoded video bitstream. Decoded picture buffer 162 may be a reference picture memory that stores reference video data for use in decoding video data by video decoder 30, e.g., in intra- or inter-coding modes. CPB 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. CPB 151 and decoded picture buffer 162 may be provided by the same memory device or separate memory devices. In various examples, CPB 151 may be on-chip with other components of video decoder 30, or off-chip relative to those components.

Entropy decoding unit 150 may receive NAL units from CPB 151 and may parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may obtain and entropy decode syntax elements from the coded slice NAL units. Each of the coded slices may include a slice header and slice data. The slice header may contain syntax elements pertaining to a slice.

In accordance with at least some of the techniques of this disclosure, video decoder 30 (e.g., one a component of video decoder 30, such as entropy decoding unit 150) may obtain, from a first bitstream that includes a coded representation of the video data, a SEI message that includes an indication of an extraction mode that was used to extract the first bitstream from a second bitstream. If the extraction mode is the first extraction mode, the first bitstream includes one or more coded pictures not needed for correct decoding of the target output layer set. If the extraction mode is the second extraction mode, the first bitstream does not include the one or more coded pictures not needed for correct decoding of the target output layer set. In some examples, video decoder 30 may be decode the first bitstream without obtaining the SEI message or without determining the extraction mode that was used to produce the first bitstream. Thus, a size-optimized bitstream may include a layer for which only a small percentage of pictures are present (e.g., those used for inter-layer prediction), video decoder 30 may nevertheless perform appropriately, reconstructing the pictures and using them as inter-layer reference pictures, without outputting the reconstructed pictures.

In addition to obtaining syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 154 may inverse quantize, i.e., de-quantize, coefficient blocks associated with TUs of the CU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive blocks (e.g., prediction luma, Cb, and Cr blocks) for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive blocks (e.g., predictive luma, Cb, and Cr blocks) for the PU.

Reconstruction unit 158 may use the residual values from the transform blocks (e.g., luma, Cb, and Cr transform blocks) of TUs of a CU and the predictive blocks (e.g., luma, Cb, and Cr transform blocks) of the PUs of the CU, i.e., either intra-prediction data or inter-prediction data, as applicable, to reconstruct the coding blocks (e.g., luma, Cb, and Cr coding blocks) of the CU. For example, reconstruction unit 158 may add samples of the transform blocks (e.g., luma, Cb, and Cr transform blocks) to corresponding samples of the predictive blocks (e.g., luma, Cb, and Cr predictive blocks) to reconstruct the coding blocks (e.g., luma, Cb, and Cr coding blocks) of the CU.

Filter unit 160 may perform a deblocking operation to reduce blocking artifacts associated with the coding blocks (e.g., luma, Cb, and Cr coding blocks) of the CU. Video decoder 30 may store the coding blocks (e.g., luma, Cb, and Cr coding blocks) of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks (e.g., luma, Cb, and Cr blocks) in decoded picture buffer 162, intra prediction or inter prediction operations on PUs of other CUs. In this way, video decoder 30 may extract, from the bitstream, transform coefficient levels of the significant coefficient block, inverse quantize the transform coefficient levels, apply a transform to the transform coefficient levels to generate a transform block, generate, based at least in part on the transform block, a coding block, and output the coding block for display.

Figure 4:
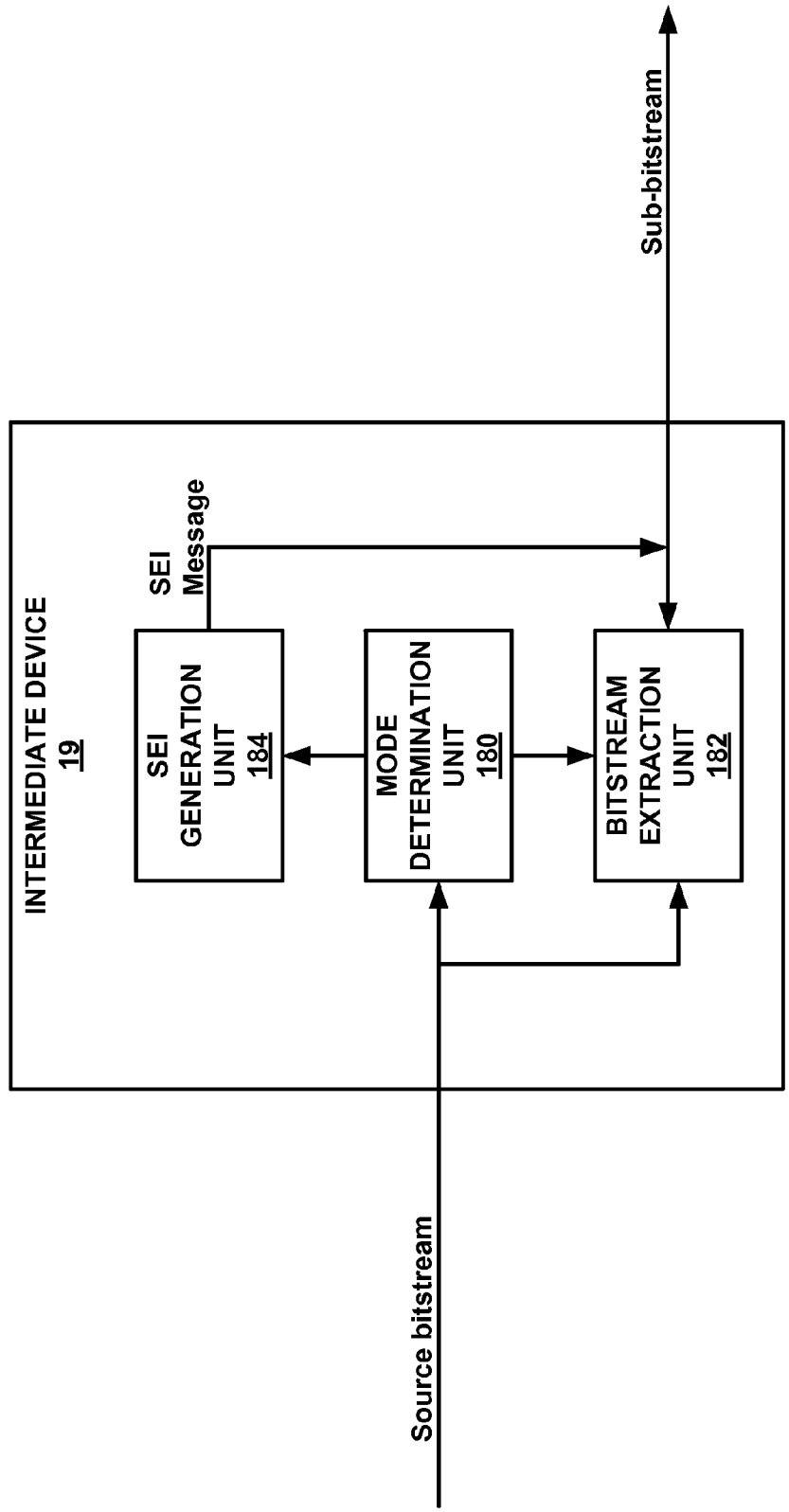
FIG. 4 is a block diagram illustrating an example intermediate device, in accordance with one or more techniques of this disclosure.

FIG. 4 is a block diagram illustrating an example intermediate device 19, in accordance with one or more techniques of this disclosure. FIG. 4 is provided for purposes of explanation and is not limiting on the techniques as broadly exemplified and described in this disclosure. In the example of FIG. 4, intermediate device 19 comprises a mode determination unit 180, a bitstream extraction unit 182, and an SEI generation unit 184.

Mode determination unit 180 and bitstream extraction unit 182 may receive a source bitstream. In some examples, mode determination unit 180 and bitstream extraction unit 182 may receive the source bitstream from a video encoder, such as video encoder 20. In other examples, mode determination unit 180 and bitstream extraction unit 182 may receive the source bitstream from another intermediate device, which may have extracted the source bitstream from another bitstream.

Mode determination unit 180 may determine which, if any bitstream extraction process to apply to the source bitstream. In one example, mode determination unit 180 may obtain, from the source bitstream, an SEI message that includes an indication of an extraction mode that was used to produce the source bitstream. In this example, if the SEI message indicates that a size optimized bitstream extraction mode was used to produce the source bitstream, mode determination unit 180 may determine not to apply any bitstream extraction process to the source bitstream. However, if the SEI message indicates that a "fully extractable" bitstream extraction mode was used to produce the source bitstream, mode determination unit 180 may determine whether to apply a "fully extractable" bitstream extraction process or a "size-optimized" bitstream extraction process to the source bitstream.

When mode determination unit 180 makes the determination to apply a bitstream extraction process to the source bitstream, mode determination unit 180 may provide an indication of the determined bitstream extraction process to bitstream extraction unit 182 and SEI generation unit 184. Bitstream extraction unit 182 may apply the determine bitstream extraction mode to extract a sub-bitstream from the source bitstream. Furthermore, SEI generation unit 184 may generate an SEI message that includes an indication of the determined bitstream extraction mode. SET generation unit 184 may include the generated SEI message in the sub-bitstream produced by the bitstream extraction unit 182.

In this way, intermediate device 19 may obtain, from a first bitstream that includes a coded representation of the video data, a SEI message that includes an indication of an extraction mode that was used to extract the first bitstream from a second bitstream. If the extraction mode is the first extraction mode, the first bitstream includes one or more coded pictures not needed for correct decoding of the target output layer set. If the extraction mode is the second extraction mode, the first bitstream does not include the one or more coded pictures not needed for correct decoding of the target output layer set.

Additionally, intermediate device 19 may include, in a first bitstream, a SEI message that includes an indication of an extraction mode that was used to extract the first bitstream from a second bitstream. If the extraction mode is the first extraction mode, the first bitstream includes one or more coded pictures not needed for correct decoding of the target output layer set. If the extraction mode is the second extraction mode, the first bitstream does not include the one or more coded pictures not needed for correct decoding of the target output layer set.

FIG. 5A is a flowchart illustrating an example operation of a computing device, in accordance with one or more techniques of this disclosure. The operation of FIG. 5A, along with operations illustrated in other flowcharts of this disclosure, are examples. Other example operations in accordance with the techniques of this disclosure may include more, fewer, or different actions.

In the example of FIG. 5A, a computing device (such as intermediate device 19 or destination device 14) may obtain, from a first bitstream that includes a coded representation of the video data, a SEI message that includes an indication of an extraction mode that was used to extract the first bitstream from a second bitstream (200). The first bitstream is a sub-bitstream extracted from the second bitstream according to the extraction mode. If the extraction mode is a first extraction mode, the first bitstream include one or more coded pictures not needed for correct decoding of a target output layer set for the first bitstream. If the extraction mode is the second extraction mode, the first bitstream does not include the one or more coded pictures not needed for correct decoding of the target output layer set. Regardless of whether the extraction mode is the first extraction mode or the second extraction mode, the first bitstream includes sufficient NAL units to decode and output pictures in the target output layer set for the first bitstream. In some examples, the SEI message conforms to the syntax shown in Table 7, above, and the indication is a conformance_indication syntax element.

Furthermore, in the example of FIG. 5A, the computing device may determine, based on the indication of the extraction mode, whether to extract a sub-bitstream from the first bitstream (202). Based on this determination, the computing device may extract the sub-bitstream from the first bitstream. As indicated above, FIG. 5A is an example. Other examples may include more, fewer, or different actions. For instance, some examples of this disclosure exclude action 202.

FIG. 5B is a flowchart illustrating an example operation of a computing device, in accordance with one or more techniques of this disclosure. In the example of FIG. 5B, a computing device (such as source device 12 or intermediate device 19) may adaptively choose an extraction operation (250). The computing device may choose the extraction operation based on various factors. For instance, the computing device may choose an extraction operation based on whether a sub-bitstream resulting from the extraction operation is or is not intended to be used by an end user or whether to allow further sub-bitstreams to be extracted from the sub-bitstream. For example, if the network path between the device performing the sub-bitstream extraction and a client device is relatively short and/or no subsequent devices that can perform sub-bitstream extraction exist along the network path to the client device, the device may select an "optimal size" extraction mode. On the other hand, if the network path between the extracting device and the client device is relatively long and/or one or more devices that can perform sub-bitstream extraction lie along the path, the extracting device may select a "fully extractable" mode.

In some examples, the extracting device is part of a CDN. The CDN may service large numbers of customers (e.g., hundreds of thousands of customers). "Up front" devices in the CDN may be configured to prefer fully extractable extraction modes or even to just avoid bitstream extraction entirely. However, the "last" MANE before client devices may be able to determine exactly what sub-bitstreams are needed by each client device (e.g., due to client devices having installed client software that determines decoding and rendering capabilities of the respective client devices), and therefore, the last MANE may "prefer" the size optimal extraction mode. That is, selection of the "optimal size" extraction near the "last mile" may be preferred because the last mile in network transmissions is typically the biggest bottleneck.

Furthermore, in the example of FIG. 5B, the computing device may extract, using the chosen extraction operation, a first bitstream from a second bitstream (252). For instance, depending on the chosen extraction operation, the computing device may extract a fully-extractable bitstream from the source bitstream or a size-optimized bitstream from the source bitstream. In some examples, the computing device generates the second bitstream. In other examples, the computing device receives the second bitstream from another computing device, such as source device 12.

The computing device may generate an SEI message that includes an indication of the extraction mode that was used to extract the first bitstream from the second bitstream (254). In other words, the SEI message includes an indication of the chosen extraction mode. For example, if the extraction mode is a first extraction mode, the first bitstream includes one or more coded pictures not needed for correct decoding of the target output layer set. In this example, if the extraction mode is a second extraction mode, the first bitstream does not include the one or more coded pictures not needed for correct decoding of the target output layer set. Regardless of whether the extraction mode is the first extraction mode or the second extraction mode, the first bitstream includes sufficient NAL units to decode and output pictures in a target output layer set for the first bitstream. In some examples, the SEI message conforms to the syntax shown in Table 7, above, and the indication is a conformance_indication syntax element. Furthermore, in the example of FIG. 5B, the computing device includes the SEI message in the first bitstream (256).

As indicated above, FIG. 5B is an example. Other examples may include more, fewer, or different actions. For instance, some examples of this disclosure exclude actions 250 and/or 252.

The following paragraphs provide various examples in accordance with this disclosure.

Example 1

A method for processing video data, the method comprising: obtaining, based on data in a bitstream, an indication, wherein the bitstream comprises an encoded representation of the video data; and determining, based at least in part on the indication, whether a sub-bitstream can be extracted from the bitstream.

Example 2

The method of example 1, wherein when the indication has a first value, the bitstream has not undergone a bitstream extraction process or the bitstream was extracted from a parent bitstream with a bitstream extraction process that allows the sub-bitstream to be extracted from the bitstream, and wherein when the indication has a second, different value, the bitstream was extracted from the parent bitstream and the sub-bitstream cannot be extracted from the bitstream.

Example 3

The method of example 1, wherein when the indication has a first value, the bitstream has not undergone a bitstream extraction process or the bitstream is a fully-extractable bitstream, and wherein when the indication has a second, different value, the bitstream is an optimal extracted bitstream.

Example 4

A method for processing video data, the method comprising: generating a bitstream that includes data that provide an indication of whether a sub-bitstream can be extracted from the bitstream.

Example 5

The method of example 4, wherein when the indication has a first value, the bitstream has not undergone a bitstream extraction process or the bitstream was extracted from a parent bitstream with a bitstream extraction process that allows the sub-bitstream to be extracted from the bitstream, and wherein when the indication has a second, different value, the bitstream was extracted from the parent bitstream and the sub-bitstream cannot be extracted from the bitstream.

Example 6

The method of example 4, wherein when the indication has a first value, the bitstream has not undergone a bitstream extraction process or the bitstream is a fully-extractable bitstream, and wherein when the indication has a second, different value, the bitstream is an optimal extracted bitstream.

Example 7

A method of processing video data, the method comprising: obtaining, from a bitstream that includes an encoded representation of the video data, an indication of a number of conformance levels for an output layer set; and for each of the conformance levels for the output layer set, obtaining, from the bitstream, a conformance level indication.

Example 8

A method of processing video data, the method comprising: including, in a bitstream that includes an encoded representation of the video data, an indication of a number of conformance levels for an output layer set: and for each of the conformance levels for the output layer set, including, in the bitstream, a conformance level indication.

Example 9

A method of processing video data, the method comprising: including, in a set of Hypothetical Reference Decoder (HRD) parameters in a bitstream that includes an encoded representation of the video data, an indication of a conformance level of an output layer set.

Example 10

A method of processing video data, the method comprising: obtaining, from a bitstream that includes a coded representation of the video data, a SEI message that includes an indication of an extraction mode that was used to produce the bitstream, wherein if the bitstream was produced using a first extraction mode, a conforming sub-bitstream is extractable from the bitstream, and wherein if the bitstream was produced using a second, different extraction mode, no conforming sub-bitstream is extractable from the bitstream.

Example 11

The method of example 10, wherein the SEI message includes data indicating a target output layer set that was used to generate the bitstream.

Example 12

A method of processing video data, the method comprising: including, in a bitstream that includes a coded representation of the video data, a SEI message that includes an indication of an extraction mode that was used to produce the bitstream, wherein if the bitstream was produced using a first extraction mode, a conforming sub-bitstream is extractable from the bitstream, and wherein if the bitstream was produced using a second, different extraction mode, no conforming sub-bitstream is extractable from the bitstream.

Example 13

The method of example 12, wherein the SEI message includes data indicating a target output layer set that was used to generate the bitstream.

Example 14

A method of processing video data, the method comprising: obtaining, from a bitstream that includes a coded representation of the video data, a syntax structure message that includes profile, tier, and level information, the syntax structure further including an indication of an extraction mode that was used to produce the bitstream, wherein if the bitstream was produced using a first extraction mode, a conforming sub-bitstream is extractable from the bitstream, and wherein if the bitstream was produced using a second, different extraction mode, no conforming sub-bitstream is extractable from the bitstream.

Example 15

A method of processing video data, the method comprising: including, in a bitstream that includes a coded representation of the video data, a syntax structure message that includes profile, tier, and level information, the syntax structure further including an indication of an extraction mode that was used to produce the bitstream, wherein if the bitstream was produced using a first extraction mode, a conforming sub-bitstream is extractable from the bitstream, and wherein if the bitstream was produced using a second, different extraction mode, no conforming sub-bitstream is extractable from the bitstream.

Example 16

A method of processing video data, the method comprising: obtaining, from metadata in an International Organization for Standardization (ISO) base media file format file that contains a bitstream that includes a coded representation of the video data, an indication of an extraction mode that was used to produce the bitstream, wherein if the bitstream was produced using a first extraction mode, a conforming sub-bitstream is extractable from the bitstream, and wherein if the bitstream was produced using a second, different extraction mode, no conforming sub-bitstream is extractable from the bitstream.

Example 17

The method of example 16, wherein the metadata is in a sample description.

Example 18

A method of processing video data, the method comprising: including metadata in an International Organization for Standardization (ISO) base media file format file that contains a bitstream that includes a coded representation of the video data, the metadata including an indication of an extraction mode that was used to produce the bitstream, wherein if the bitstream was produced using a first extraction mode, a conforming sub-bitstream is extractable from the bitstream, and wherein if the bitstream was produced using a second, different extraction mode, no conforming sub-bitstream is extractable from the bitstream.

Example 19

The method of example 18, wherein the metadata is in a sample description.

Example 20

A method of processing video data, the method comprising: performing a first bitstream extraction process that extracts a first sub-bitstream from a parent bitstream, wherein the bitstream extraction process takes as inputs a target output layer set, a target temporal identifier, and a third parameter, wherein the third parameter is allowed to be an index to an output layer set and a bitstream extraction mode indicator, a target output layer identified list and the bitstream extraction mode indicator, or a target layer identifier list, wherein performing the first bitstream extraction process comprises invoking a second bitstream extraction process that takes as inputs the target output layer set and the target temporal identifier.

Example 21

The method of example 21, wherein the second bitstream extraction process further takes as input the bitstream extraction mode indicator.

Example 22

A method of processing video data, the method comprising: determining, based at least in part on data in a box or a descriptor in a file, an extraction level indication, wherein the box or the descriptor describes an operation point represented with at least one output layer set, wherein if the extraction level indication has a first value, a conforming sub-bitstream is extractable from the bitstream, and wherein if the extraction level indication has a second, different value, no conforming sub-bitstream is extractable from the bitstream.

Example 23

The method of example 22, wherein the file conforms to an International Organization for Standardization (ISO) base media file format or an MPEG-2 TS file format.

Example 24

A method of processing video data, the method comprising: including, in a box or a descriptor in a file, data that indicate an extraction level indication, wherein the box or the descriptor describes an operation point represented with at least one output layer set, wherein if the extraction level indication has a first value, a conforming sub-bitstream is extractable from the bitstream, and wherein if the extraction level indication has a second, different value, no conforming sub-bitstream is extractable from the bitstream.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In one or more examples, the functions described may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the functions may be stored on or transmitted over, as one or more instructions or code, a computer-readable medium and executed by a hardware-based processing unit. In other words, if implemented in software, the techniques may be realized at least in part by a computer-readable data storage medium comprising program code including instructions that, when executed, performs one or more of the methods described above. Computer-readable media may include computer-readable storage media, which corresponds to a tangible medium such as data storage media, or communication media including any medium that facilitates transfer of a computer program from one place to another. e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. The computer-readable data storage medium may form part of a computer program product, which may include packaging materials. Thus, a computer program product may include a computer-readable medium.

By way of example, and not limitation, such computer-readable storage media can comprise RAM, ROM, non-volatile random access memory (NVRAM), EEPROM, CD-ROM, FLASH memory, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. The techniques additionally, or alternatively, may be realized at least in part by a computer-readable communication medium that carries or communicates program code in the form of instructions or data structures and that can be accessed, read, and/or executed by a computer, such as propagated signals or waves. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. Such a processor may be configured to perform any of the techniques described in this disclosure. In addition, in some aspects, the functionality described herein may be provided within dedicated hardware and/or software modules configured for encoding and decoding, or incorporated in a combined codec. Also, the techniques could be fully implemented in one or more circuits or logic elements.

A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device. The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Various examples have been described. These and other examples are within the scope of the following claims.

What is claimed is:

1. A method of processing video data, the method comprising:
    obtaining a Supplemental Enhancement Information (SEI) message that includes an indication of an extraction mode that was used to extract a second bitstream from a first bitstream, a target output layer set for the second bitstream being signaled in the SEI message, the indication of the extraction mode indicating which one of a first extraction mode and a second extraction mode is the extraction mode that was used to extract the second bitstream from the first bitstream, wherein:
        regardless of whether the extraction mode is the first extraction mode or the second extraction mode, the second bitstream includes sufficient Network Abstraction Layer (NAL) units to decode and output pictures in the target output layer set for the second bitstream,
        use of the first extraction mode to extract the second bitstream from the first bitstream results in the second bitstream including one or more coded pictures not needed for correct decoding of the target output layer set for the second bitstream,
        use of the second extraction mode to extract the second bitstream from the first bitstream results in the second bitstream not including the one or more coded pictures not needed for correct decoding of the target output layer set for the second bitstream,
        use of either the first extraction mode or the second extraction mode results in, for each respective NAL unit of the first bitstream, removal of the respective NAL unit from the first bitstream such that the respective NAL unit is not in the second bitstream if both of the following criteria are satisfied for the respective NAL unit:
            i) the respective NAL unit has a layer identifier not among layer identifiers in a list of target output layer identifiers for the second bitstream, and
            ii) a temporal identifier of the respective NAL unit is greater than a maximum temporal identifier of inter-layer reference pictures used by pictures of a layer to which the respective NAL unit belongs, and
        use of the second extraction mode further results in the respective NAL unit being removed from the first bitstream such that the respective NAL unit is not in the second bitstream if a flag of the respective NAL unit specifies that a coded picture corresponding to the respective NAL unit is not used as a reference picture for inter prediction and is not used as an inter-layer reference picture in a decoding process of subsequent pictures in decoding order;
    determining, based on the indication of the extraction mode, whether to extract a third bitstream from the second bitstream, the third bitstream being a sub-bitstream of the second bitstream;
    based on a determination to extract the third bitstream, extracting the third bitstream from the second bitstream; and
    transmitting or decoding the third bitstream.

2. The method of claim 1, wherein the first extraction mode targets self-completeness, and the second extraction mode targets size optimization.

3. The method of claim 1, further comprising:
    determining that a fully-extractable sub-bitstream can be extracted from the second bitstream, so long as a target output layer set for the fully-extractable sub-bitstream does not exceed the target output layer set for the second bitstream,
    wherein the fully-extractable sub-bitstream contains sufficient Network Abstraction Layer (NAL) units to decode pictures within the target output layer set for the fully-extractable sub-bitstream.

4. The method of claim 1, wherein:
    the indication of the extraction mode indicates a conformance level,
    the conformance level equal to 0 indicates that a highest temporal identifier of each layer in a present layer set is equal to a maximum temporal identifier of the present layer set and that each access unit of the second bitstream contains one picture from each layer in the present layer set, the present layer set is a set of layers present for the second bitstream, the maximum temporal identifier of the present layer set is a greatest temporal identifier of pictures in layers in the present layer set, the conformance level equal to 1 indicates:
- that a highest temporal identifier of each layer in the target output layer set for the second bitstream is equal to the maximum temporal identifier of the present layer set and each access unit of the second bitstream contains one picture from each layer in the target output layer set for the second bitstream, and
- for each respective layer in the present layer set that is not in the target output layer set for the second bitstream, if a highest temporal identifier of pictures in the respective layer is the maximum temporal identifier of the present layer set, each access unit with a temporal identifier smaller than or equal to the maximum temporal identifier of the present layer set includes a picture in the respective layer.

5. The method of claim 1, wherein:
the indication of the extraction mode indicates a conformance level,
the conformance level equal to 0 indicates that a highest temporal identifier of each layer in a present layer set is equal to a maximum temporal identifier of the present layer set and that each access unit of the second bitstream contains one picture from each layer in the present layer set,
the present layer set is a set of layers present for the second bitstream,
the maximum temporal identifier of the present layer set is a greatest temporal identifier of pictures in layers in the present layer set, and
the conformance level equal to 1 indicates that, for each respective layer in the present layer set, if a highest temporal identifier of pictures in the respective layer is the maximum temporal identifier of the present layer set, each access unit with a temporal identifier smaller than or equal to the maximum temporal identifier of the present layer set includes a picture in the respective layer.

6. A method of processing video data, the method comprising:
extracting a second bitstream from a first bitstream;
generating a Supplemental Enhancement Information (SEI) message that includes an indication of an extraction mode that was used to extract the second bitstream from the first bitstream, the first and second bitstreams including coded representations of video data, a target output layer set for the second bitstream being signaled in the SEI message, and the indication of the extraction mode indicating which one of a first extraction mode and a second extraction mode is the extraction mode that was used to extract the second bitstream from the first bitstream, wherein:
regardless of whether the extraction mode is the first extraction mode or the second extraction mode, the second bitstream includes sufficient Network Abstraction Layer (NAL) units to decode and output pictures in the target output layer set for the second bitstream,
use of the first extraction mode to extract the second bitstream from the first bitstream results in the second bitstream including one or more coded pictures not needed for correct decoding of the target output layer set for the second bitstream,
use of the second extraction mode to extract the second bitstream from the first bitstream results in the second bitstream not including the one or more coded pictures not needed for correct decoding of the target output layer set for the second bitstream,
use of either the first extraction mode or the second extraction mode results in, for each respective NAL unit of the first bitstream, removal of the respective NAL unit from the first bitstream such that the respective NAL unit is not in the second bitstream if both of the following criteria are satisfied for the respective NAL unit:
  i) the respective NAL unit has a layer identifier not among layer identifiers in a list of target output layer identifiers for the second bitstream, and
  ii) a temporal identifier of the respective NAL unit is greater than a maximum temporal identifier of inter-layer reference pictures used by pictures of a layer to which the respective NAL unit belongs, and
use of the second extraction mode further results in the respective NAL unit being removed from the first bitstream such that the respective NAL unit is not in the second bitstream if a flag of the respective NAL unit specifies that a coded picture corresponding to the respective NAL unit is not used as a reference picture for inter prediction and is not used as an inter-layer reference picture in a decoding process of subsequent pictures in decoding order; and
outputting the SEI message and the second bitstream.

7. The method of claim 6, wherein the first extraction mode targets self-completeness, and the second extraction mode targets size optimization.

8. The method of claim 6, wherein:
a fully-extractable sub-bitstream can be extracted from the second bitstream, so long as a target output layer set for the fully-extractable sub-bitstream does not exceed the target output layer set for the second bitstream, and
the fully-extractable sub-bitstream contains sufficient Network Abstraction Layer (NAL) units to decode pictures within the target output layer set for the fully-extractable sub-bitstream.

9. The method of claim 6, wherein:
the indication of the extraction mode indicates a conformance level,
the conformance level equal to 0 indicates that a highest temporal identifier of each layer in a present layer set is equal to a maximum temporal identifier of the present layer set and that each access unit of the second bitstream contains one picture from each layer in the present layer set,
the present layer set is a set of layers present for the second bitstream,
the maximum temporal identifier of the present layer set is a greatest temporal identifier of pictures in layers in the present layer set,
the conformance level equal to 1 indicates:
that a highest temporal identifier of each layer in the target output layer set is equal to the maximum temporal identifier of the present layer set and each access unit of the second bitstream contains one picture from each layer in the target output layer set, and for each respective layer in the present layer set that is not in the target output layer set, if a highest temporal identifier of pictures in the respective layer is the maximum temporal identifier of the present layer set, each access unit with a temporal identifier smaller than or equal to the maximum temporal identifier of the present layer set includes a picture in the respective layer.

10. The method of claim 6, wherein:
the indication of the extraction mode indicates a conformance level,
the conformance level equal to 0 indicates that a highest temporal identifier of each layer in a present layer set is equal to a maximum temporal identifier of the present layer set and that each access unit of the second bitstream contains one picture from each layer in the present layer set,
the present layer set is a set of layers present for the first bitstream,
the maximum temporal identifier of the present layer set is a greatest temporal identifier of pictures in layers in the present layer set, and
the conformance level equal to 1 indicates that, for each respective layer in the present layer set, if a highest temporal identifier of pictures in the respective layer is the maximum temporal identifier of the present layer set, each access unit with a temporal identifier smaller than or equal to the maximum temporal identifier of the present layer set includes a picture in the respective layer.

11. The method of claim 6, further comprising:
adaptively choosing the extraction mode; and
extracting, using the chosen the extraction mode, the second bitstream from the first bitstream.

12. A device for processing video data, the device comprising:
a memory configured to store the video data; and
one or more processors configured to:
  obtain a Supplemental Enhancement Information (SEI) message that includes an indication of an extraction mode that was used to extract a second bitstream from a first bitstream, wherein the first bitstream that includes a coded representation of the video data, a target output layer set for the second bitstream is signaled in the SEI message, the indication of the extraction mode indicating which one of a first extraction mode and a second extraction mode is the extraction mode that was used to extract the second bitstream from the first bitstream, wherein:
    regardless of whether the extraction mode is the first extraction mode or the second extraction mode, the second bitstream includes sufficient Network Abstraction Layer (NAL) units to decode and output pictures in the target output layer set for the second bitstream,
    use of the first extraction mode to extract the second bitstream from the first bitstream results in the second bitstream including one or more coded pictures not needed for correct decoding of the target output layer set for the second bitstream,
    use of the second extraction mode to extract the second bitstream from the first bitstream results in the second bitstream not including the one or more coded pictures not needed for correct decoding of the target output layer set for the second bitstream,
    use of either the first extraction mode or the second extraction mode results in, for each respective NAL unit of the first bitstream, removal of the respective NAL unit from the first bitstream such that the respective NAL unit is not in the second bitstream if both of the following criteria are satisfied for the respective NAL unit:
      i) the respective NAL unit has a layer identifier not among layer identifiers in a list of target output layer identifiers for the second bitstream, and
      ii) a temporal identifier of the respective NAL unit is greater than a maximum temporal identifier of inter-layer reference pictures used by pictures of a layer to which the respective NAL unit belongs, and
    use of the second extraction mode further results in the respective NAL unit being removed from the first bitstream such that the respective NAL unit is not in the second bitstream if a flag of the respective NAL unit specifies that a coded picture corresponding to the respective NAL unit is not used as a reference picture for inter prediction and is not used as an inter-layer reference picture in a decoding process of subsequent pictures in decoding order;
  determine, based on the indication of the extraction mode, to extract a third bitstream from the second bitstream, the third bitstream being a sub-bitstream of the second bitstream;
  based on a determination to extract the third bitstream, extract the third bitstream from the second bitstream; and
  transmit or decode the third bitstream.

13. A device for processing video data, the device comprising:
a memory configured to store the video data; and
one or more processors configured to:
  extract a second bitstream from a first bitstream;
  generate a Supplemental Enhancement Information (SEI) message that includes an indication of an extraction mode that was used to extract the second bitstream from the first bitstream, the first and second bitstreams including coded representations of the video data, a target output layer set for the second bitstream being signaled in the SEI message, the indication of the extraction mode indicating which one of a first extraction mode and a second extraction mode is the extraction mode that was used to extract the second bitstream from the first bitstream, wherein:
    regardless of whether the extraction mode is the first extraction mode or the second extraction mode, the second bitstream includes sufficient Network Abstraction Layer (NAL) units to decode and output pictures in the target output layer set for the second bitstream,
    use of the first extraction mode to extract the second bitstream from the first bitstream results in the second bitstream including one or more coded pictures not needed for correct decoding of the target output layer set for the second bitstream,
    use of the second extraction mode to extract the second bitstream from the first bitstream results in the second bitstream not including the one or more coded pictures not needed for correct decoding of the target output layer set for the second bitstream,
    use of either the first extraction mode or the second extraction mode results in, for each respective NAL unit of the first bitstream, removal of the respective NAL unit from the first bitstream such that the respective NAL unit is not in the second bitstream if both of the following criteria are satisfied for the respective NAL unit:
  i) the respective NAL unit has a layer identifier not among layer identifiers in a list of target output layer identifiers for the second bitstream, and
  ii) a temporal identifier of the respective NAL unit is greater than a maximum temporal identifier of inter-layer reference pictures used by pictures of a layer to which the respective NAL unit belongs, and
use of the second extraction mode further results in the respective NAL unit being removed from the first bitstream such that the respective NAL unit is not in the second bitstream if a flag of the respective NAL unit specifies that a coded picture corresponding to the respective NAL unit is not used as a reference picture for inter prediction and is not used as an inter-layer reference picture in a decoding process of subsequent pictures in decoding order; and output the SEI message and the second bitstream.

* * * * *